(12) United States Patent
Li et al.

(10) Patent No.: US 11,699,829 B2
(45) Date of Patent: Jul. 11, 2023

(54) BOX OF BATTERY, BATTERY, POWER CONSUMPIION APPARATUS, METHOD FOR PRODUCING BATTERY AND APPARATUS FOR PRODUCING BATTERY

(71) Applicant: CONTEMPORARY AMPEREX TECHNOLOGY CO., LIMITED, Ningde (CN)

(72) Inventors: Yao Li, Ningde (CN); Xiaobo Chen, Ningde (CN); Mingguang Gu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/951,816

(22) Filed: Sep. 23, 2022

(65) Prior Publication Data

US 2023/0018764 A1    Jan. 19, 2023

Related U.S. Application Data

(63) Continuation of application No. 17/459,457, filed on Aug. 27, 2021, now Pat. No. 11,522,250, which is a
(Continued)

(51) Int. Cl.
*H01M 50/342* (2021.01)
*H01M 50/209* (2021.01)
(Continued)

(52) U.S. Cl.
CPC ..... *H01M 50/3425* (2021.01); *H01M 50/209* (2021.01); *H01M 10/6556* (2015.04);
(Continued)

(58) Field of Classification Search
CPC ......... H01M 10/6556; H01M 2220/20; H01M 50/209; H01M 50/342; H01M 50/3425; H01M 50/35; Y02E 60/10
See application file for complete search history.

(56) References Cited

U.S. PATENT DOCUMENTS

| | | | |
|---|---|---|---|
| 2015/0125720 A1 | 5/2015 | Fujii et al. | |
| 2019/0207184 A1 | 7/2019 | Koutari et al. | |
| 2021/0074979 A1 | 3/2021 | Kwak et al. | |

FOREIGN PATENT DOCUMENTS

| | | |
|---|---|---|
| CN | 112018302 A | 12/2020 |
| CN | 112086605 A | 12/2020 |
| DE | 102018125446 A1 | 4/2020 |

OTHER PUBLICATIONS

Office Action dated Jan. 11, 2022 received in U.S. Appl. No. 17/459,457.
(Continued)

*Primary Examiner* — Lingwen R Zeng
(74) *Attorney, Agent, or Firm* — Scully, Scott, Murphy & Presser, P.C.

(57) ABSTRACT

An embodiment of the present application is provided with a battery box, a battery, a power consumption device, and a method for producing a battery and an apparatus for producing a battery. The box of the battery includes: an electrical chamber, configured to accommodate a battery cell group; a collection chamber, configured to collect emissions of the battery cell provided with the pressure relief mechanism when the pressure relief mechanism is actuated; an isolation component for isolating the electrical chamber and the collection chamber, such that the electrical chamber and the collection chamber are arranged on both sides of the isolation component; wherein a surface of the isolation component that is close to the battery cell group is provided with an avoidance opening, the avoidance opening extends
(Continued)

along the first direction, and the plurality of pressure relief mechanisms of the battery cell group face the avoidance opening.

20 Claims, 13 Drawing Sheets

Related U.S. Application Data continuation of application No. PCT/CN2021/082464, filed on Mar. 23, 2021.

(51) Int. Cl.
*H01M 10/6556* (2014.01)
*H01M 50/35* (2021.01)

(52) U.S. Cl.
CPC .......... *H01M 50/342* (2021.01); *H01M 50/35* (2021.01); *H01M 2220/20* (2013.01); *Y02E 60/10* (2013.01)

(56) References Cited

OTHER PUBLICATIONS

Office Action dated Apr. 26, 2022 received in U.S. Appl. No. 17/459,457.
Notice of Allowance dated Aug. 10, 2022 received in U.S. Appl. No. 17/459,457.
Extended European Search Report dated May 8, 2023 received in European Patent Application No. EP 21730787.5.

BOX OF BATTERY, BATTERY, POWER CONSUMPTION APPARATUS, METHOD FOR PRODUCING BATTERY AND APPARATUS FOR PRODUCING BATTERY

CROSS-REFERENCE TO RELATED APPLICATIONS

This application is a continuation of U.S. patent application Ser. No. 17/459,457 filed on Aug. 27, 2021, which is a continuation of International Application No. PCT/CN2021/082464, filed on Mar. 23, 2021. The disclosure of which is hereby incorporated by reference in its entirety.

TECHNICAL FIELD

The present application relates to the field of battery technologies, and in particular, to a box of battery, a battery, a power consumption apparatus, a method for producing battery and an apparatus for producing battery.

BACKGROUND

Energy saving and emission reduction are the key to the sustainable development of the automotive industry. In this case, electric vehicles have become an important part of the sustainable development of the automotive industry due to their advantages of energy conservation and environmental protection. For electric vehicles, the battery technology is also an important factor for their development.

During the development of the battery technology, in addition to improve the performance of a battery, safety is also an issue that cannot be ignored. If the safety of the battery cannot be ensured, then the battery cannot be used. Therefore, how to enhance the safety of the battery is an urgent technical problem to be solved in the battery technology.

SUMMARY

The present application is provided with a box of battery, a battery, a power consumption apparatus, and a method for producing a battery and an apparatus for producing a battery, which can enhance the safety of the battery.

In a first aspect, a box of battery is provided, including: an electrical chamber, configured to accommodate a battery cell group, where the battery cell group includes a plurality of battery cells arranged along a first direction, at least two battery cells of the plurality of battery cells include respectively a pressure relief mechanism, the pressure relief mechanism is disposed on a first wall of the battery cell, and the pressure relief mechanism is configured to be actuated when internal pressure or a temperature of the battery cell reaches a threshold value to relieve the internal pressure; a collection chamber, configured to collect emissions of the battery cell provided with the pressure relief mechanism when the pressure relief mechanism is actuated; an isolation component, configured to isolate the electrical chamber from the collection chamber, such that the electrical chamber and the collection chamber are arranged on both sides of the isolation component; where the first wall is attached to the isolation component, a surface of the isolation component that is close to the battery cell group is provided with an avoidance opening, the avoidance opening extends along the first direction, and the plurality of pressure relief mechanisms of the battery cell group face the avoidance opening.

In the technical solution of the embodiment of the present application, the isolation component is used to separate the electrical chamber for accommodating the battery cell and the collection chamber for collecting the emissions. When the pressure relief mechanism is actuated, the emissions of the battery cell enter the collection chamber instead of the electrical chamber, or a small amount of the emissions enter the electrical chamber, so that the electrical connection component in the electrical chamber is not conductive and short-circuited, and therefore the safety of the battery can be enhanced. By providing the avoidance opening corresponding to the pressure relief mechanism of the battery cell group in the box of the battery, the pressure relief mechanism is prevented from being blocked, and the pressure relief mechanism is ensured to be able to smoothly discharge the emissions. At the same time, compared with the solution that each pressure relief mechanism is in one-to-one correspondence with each avoidance opening (this solution has extremely high requirements to assembly, if a cumulative tolerance of the assembly exceeds an allowable range, the pressure relief mechanism of some battery cells will not be aligned with the corresponding avoidance opening, thereby being blocked by the isolation component, therefore the emissions are not discharged smoothly when the pressure relief mechanism is actuated, and in extreme cases, the battery cell will explode because the pressure is not relieved in time). By providing the avoidance opening extending along the first direction, and making all of the plurality of pressure relief mechanisms of the battery cell group face the avoidance openings, the difficulty of aligning the pressure relief mechanism with the avoidance opening can be greatly reduced, thereby preventing the pressure relief mechanism from being blocked.

In some embodiments, all of the pressure relief mechanisms of the battery cell group face the avoidance opening.

Since all of the pressure relief mechanisms of the battery cell group in the embodiment of the present application can face the avoidance openings, such that when all of the pressure relief mechanisms are actuated, their emissions can smoothly pass through the avoidance openings and enter the collection chamber, thereby ensuring the safety of the battery.

In some embodiments, the avoidance opening is configured to be capable of providing a deformation space for the pressure relief mechanism, such that the pressure relief mechanism deforms and ruptures in a direction close to the isolation component when the internal pressure and temperature of the battery cell reaches a threshold value.

Since the avoidance opening can provide the deformation space for the pressure relief mechanism, such that the pressure relief mechanism deforms and raptures towards a direction that is close to the isolation component when the internal pressure or temperature of the battery cell reaches the threshold, therefore the pressure relief mechanism can be opened smoothly such that the emissions are discharged to the outside.

In some embodiments, each battery cell of the plurality of battery cells includes the pressure relief mechanism. Thus, it can be ensured that when the internal pressure or temperature of any one of battery cells increases, the internal pressure can be relieved through the pressure relief mechanism, thereby preventing the battery cell from exploding.

In some embodiments, the avoidance opening is a recess or a through hole.

By providing the recess or the through hole, the pressure relief mechanism can be opened smoothly, and thus the batter discharges the emissions to the outside.

In some embodiments, a width of the avoidance opening along a second direction is greater than a width of the pressure relief mechanism along the second direction, where the second direction is perpendicular to the first direction.

By providing the width of the avoidance opening to be greater than the width of the pressure relief mechanism, the pressure relief mechanism is prevented from being blocked.

In some embodiments, the avoidance opening is a recess, and a bottom wall of the recess is provided with at least one exhaust hole, and the emissions of the battery cell provided with the pressure relief mechanism enter the collection chamber through the exhaust hole.

By providing the exhaust hole, the emissions of the battery cell provided with the pressure relief mechanism can enter the collection chamber through the exhaust hole, thereby preventing a large amount of emissions from being blocked by the isolation component and entering the electrical chamber.

In some embodiments, there are a plurality of the exhaust holes, and each exhaust hole is arranged opposite to a corresponding pressure relief mechanism.

By providing the plurality of exhaust holes, and each exhaust hole being arranged opposite to the corresponding pressure relief mechanism, the emissions can quickly enter the collection chamber through the exhaust hole.

In some embodiments, the box includes at least one gas blocking bar, the gas blocking bar is disposed at the bottom wall of the recess, and the gas blocking bar is configured to divide the recess into at least two spaces along the first direction.

By providing the gas blocking bar in the box, the emissions discharged by the battery cell that the pressure relief mechanism is actuated can be prevented from impacting the adjacent battery cells, thereby preventing the adjacent battery cells from experiencing a thermally runaway, so that the safety performance of the battery is enhanced.

In some embodiments, there are a plurality of the gas blocking bars, and the plurality of the gas blocking bars are arranged along the first direction, such that the gas blocking bar is arranged between the two adjacent pressure relief mechanisms.

By providing the gas blocking bars between the adjacent pressure relief mechanisms, the emissions discharged by any one of the actuated battery cells can be prevented from impacting the adjacent battery cells, so that the safety performance of the battery is further enhanced.

In some embodiments, the gas blocking bar is made of a compressible material, and the gas blocking bar is compressed by the first wall and the bottom wall of the recess.

Since the gas blocking bar is made of the compressible material, and the gas blocking bar is compressed by the first wall and the bottom wall of the recess, thus a good sealing effect can be ensured, thereby better preventing the emissions discharged by the battery cell that the pressure relief mechanism is actuated from impacting the adjacent battery cells.

In some embodiments, notches are provided on two side walls of the recess along the second direction, and the notches are configured to place the gas blocking bars, and the second direction is perpendicular to the first direction.

The notches are provided on the side walls of the recess of the embodiment of the present application, so the rapid positioning of the gas blocking bars can be achieved, to facilitate the rapid installation and assembly of the battery.

In some embodiments, a blocking member is provided at an outer side of an opening of the recess along the second direction, and the blocking member is configured to block an adhesive from entering the recess, where the adhesive is configured to fix the first wall to the isolation component, and the second direction is perpendicular to the first direction.

By providing the blocking member at the outer side of the recess, the adhesive can be prevented from entering the recess, avoiding the problems that the emissions of the pressure relief mechanism cannot be smoothly discharged from the recess caused by the blocking of the recess by the adhesive, thereby enhancing the safety of the battery.

Optionally, the above blocking member may be a rubber blocking strip, and the above adhesive may be a structural glue.

In some embodiments, a second recess is provided at the surface of the isolation component that is close to the battery cell group, and the second recess extends along the first direction and is located at the outer side of the opening of the recess along the second direction, and the second recess is configured to accommodate the blocking member.

By providing the second recess for accommodating the blocking member at the outer side of the recess, the positioning and fixing of the blocking member can be achieved.

In some embodiments, the blocking member is made of a compressible material, and the blocking member is compressed by the surface of the isolation component that is close to the battery cell group and a bottom wall of the second recess.

Since the blocking member is made of the compressible material, the blocking member is compressed by the surface of the battery cell group and the bottom wall of the second recess, so that a good sealing effect can be ensured, thereby better preventing the adhesive from entering the recess.

In some embodiments, the inside of the isolation component is provided with a flow channel, and the flow channel is configured to contain a fluid such that the isolation component adjusts the temperature for the battery cell.

By providing the flow channel for containing the fluid inside of the isolation component, the fluid in the flow channel can be used to transfer heat through the heat-conducting material, thereby achieving cooling or heating of the battery cell.

In some embodiments, the isolation component is configured to be capable of being damaged when the pressure relief mechanism is actuated, such that the fluid is discharged from inside of the isolation component.

By providing the isolation component to contain the fluid and the isolation component being capable of being damaged when the pressure relief mechanism is actuated, so that the fluid in the isolation component can be discharged to cool the battery cell, thereby further improving the safety performance of the battery.

In some embodiments, the isolation component includes a first plate and a second plate, the first plate is located at one side of the second plate that is close to the electrical chamber and attached to the first wall, a first region of the first plate is recessed towards the second plate to form the recess, and the first region is connected to the second plate.

The isolation component in the embodiment of the present application includes a first plate and a second plate. A flow channel containing a fluid can be formed in the isolation component with the first plate and the second plate, thereby cooling or heating the battery cell.

In some embodiments, the first region is provided with at least one first exhaust hole, and the first exhaust hole is disposed opposite to the pressure relief mechanism By providing the exhaust hole at the first region opposite to the pressure relief mechanism, the emissions of the pressure relief mechanism can be smoothly discharged and enter the collection chamber, thereby ensuring the safety of the battery.

In some embodiments, the first region is provided with a plurality of the first exhaust holes, and the plurality of first exhaust holes are disposed at intervals.

By providing the plurality of first exhaust holes disposed at intervals, optionally, the plurality of first exhaust holes can be in one-to-one correspondence with the pressure relief mechanisms of the battery cell, in this way, it can be ensured that when the pressure mechanism is actuated, the emissions of each battery cell can smoothly enter the collection chamber through the exhaust hole, thereby ensuring the safety of the battery.

In some embodiments, the second plate is provided with a second exhaust hole at a position corresponding to the first exhaust hole.

By providing the second exhaust holes corresponding to the first exhaust holes, the emissions of the pressure relief mechanism can be ensured to be smoothly discharged to the outside of the electrical chamber through the first exhaust holes and the second exhaust holes, and enter the collection chamber, thereby ensuring the safety of the battery. Optionally, the above plurality of the first exhaust holes may be in one-to-one correspondence with the pressure relief mechanisms.

In some embodiments, the first exhaust hole is sealed by a sealing layer and/or the second exhaust hole is sealed by a sealing layer.

By sealing the above first exhaust holes and/or second exhaust holes with the sealing layer, the sealing of the collection chamber can be achieved, thereby isolating the electrical chamber from the collection chamber, and preventing the influence of the gas in the collection chamber on the electrical chamber.

In some embodiments, a thickness of the sealing layer is 0.05 mm-0.3 mm.

In some embodiments, a thickness of a region of the second plate corresponding to the first exhaust hole is less than thicknesses of other regions of the second plate.

By providing the thickness of the region of the second plate corresponding to the first exhaust hole to be less than the thicknesses of other regions of the second plate, when the pressure relief mechanism is actuated, the region of the second plate corresponding to the first exhaust hole is more likely to be damaged by the emissions, therefore the emissions can smoothly enter the collection chamber and the safety of the battery is ensured.

In some embodiments, a weakened zone is provided at a bottom wall of the avoidance opening, the weakened zone is configured to be capable of being damaged by the emissions discharged from inside of the battery cell when the pressure relief mechanism is actuated, such that the emissions enter the collection chamber through the weakened zone.

By providing the bottom wall of the avoidance opening with the weakened zone, so that when the pressure relief mechanism is actuated, the emissions can pass through the weakened zone and enter the collection chamber, thus preventing the emissions from entering the electrical chamber. And it can be also ensured that the electrical chamber is isolated from the collection chamber when the pressure relief mechanism is not actuated, thus preventing water vapor and other substances in the collection chamber from entering the electrical chamber to cause the short-circuit hazard.

In some embodiments, a thickness of the weakened zone is less than or equal to 3 mm.

In some embodiments, the weakened zone has a lower melting point than other regions of the isolation component other than the weakened zone.

The weakened zone in the embodiment of the application has a lower melting point than other regions of the isolation component other than the weakened zone, so that the weakened zone is more likely to be damaged when impacted by the emissions of the pressure relief mechanism, therefore the emissions can be smoothly discharged to the collection chamber and the safety of the battery can be ensured.

In some embodiments, a material adopted by the weakened zone has a melting point below 400° C.

In some embodiments, the isolation component is provided with a second through hole, and the emissions are discharged through the second through hole.

By providing the second through hole, the emissions are discharged through the second through hole instead of being discharged to the outside the battery after entering the collection chamber, which can further extend the path of discharging the emissions, reduce the impact of the emissions on the external environment, and ensure the safety of the external environment.

In some embodiments, the emissions enter an exhaust channel of the electrical chamber through the second through hole and is discharged through the exhaust channel.

The emissions in the embodiment of the application enter the exhaust channel in the electrical chamber through the second through hole and then are discharged, which can further extend the path of discharging the gas and reduce the impact of the emissions on the external environment.

In some embodiments, the isolation component is provided with a wall shared by the electrical chamber and the collection chamber.

Since the isolation component can isolate the emissions from the electrical chamber, as the wall shared by the electrical chamber and the collection chamber, therefore the hazard of the emissions is reduced and the safety of the battery is enhanced.

In some embodiments, the box further includes: a protective member, where the protective member is configured to protect the isolation component, and the collection chamber is formed with the protective member and the isolation component.

The collection chamber formed by the protective member and the isolation component can effectively collect and buffer the emissions and reduce the risk resulting therefrom. At the same time, the protective member can protect the isolation component and prevent the isolation component from being damaged by foreign objects.

In a second aspect, a battery cell group is provided, including: a plurality of battery cells arranged along a first direction, at least two battery cells of the plurality of battery cells include respectively a pressure relief mechanism, the pressure relief mechanism is configured to be actuated when internal pressure or a temperature of the battery cell provided with the pressure relief mechanism reaches a threshold value to relieve the internal pressure; and the box according to the first aspect.

In a third aspect, a power consumption apparatus is provided, including: the battery according to the second aspect.

In some embodiments, the power consumption apparatus is a vehicle, a ship or a spacecraft.

In a fourth aspect, a method for producing a battery is provided, including: providing a battery cell group, where the battery cell group includes a plurality of battery cells arranged along a first direction, at least two battery cells of the plurality of battery cells include respectively a pressure relief mechanism, the pressure relief mechanism is disposed on a first wall of the battery cell, and the pressure relief mechanism is configured to be actuated when internal pressure or a temperature of the battery cell reaches a threshold value to relieve the internal pressure; providing a box, where the box includes: an electrical chamber, configured to accommodate the battery cell group; a collection chamber, configured to collect emissions of the battery cell provided with the pressure relief mechanism when the pressure relief mechanism is actuated; an isolation component, configured to isolate the electrical chamber from the collection chamber, such that the electrical chamber and the collection chamber are arranged at both sides of the isolation component; a surface of the isolation component that is close to the battery cell group is provided with an avoidance opening, the avoidance opening extends along the first direction, and the plurality of pressure relief mechanisms of the battery cell group face the avoidance opening.

In a fifth aspect, an apparatus for producing a battery is provided, including a first provision module, configured to provide a battery cell group, where the battery cell group includes a plurality of battery cells arranged along a first direction, at least two battery cells of the plurality of battery cells include respectively a pressure relief mechanism, the pressure relief mechanism is disposed on a first wall of the battery cell, and the pressure relief mechanism is configured to be actuated when internal pressure or a temperature of the battery cell reaches a threshold value to relieve the internal pressure; a second provision module, configured to provide a box, where the box includes: an electrical chamber, configured to accommodate the battery cell group; a collection chamber, configured to collect emissions of the battery cell provided with the pressure relief mechanism when the pressure relief mechanism is actuated; an isolation component, configured to isolate the electrical chamber from the collection chamber, such that the electrical chamber and the collection chamber are arranged at both sides of the isolation component; and an installation module, configured to provide an avoidance opening at a surface of the isolation component that is close to the battery cell group, where the avoidance opening extends along the first direction, and the plurality of pressure relief mechanisms of the battery cell group face the avoidance opening.

BRIEF DESCRIPTION OF DRAWINGS

To describe the technical solutions in the embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

Figure 1:
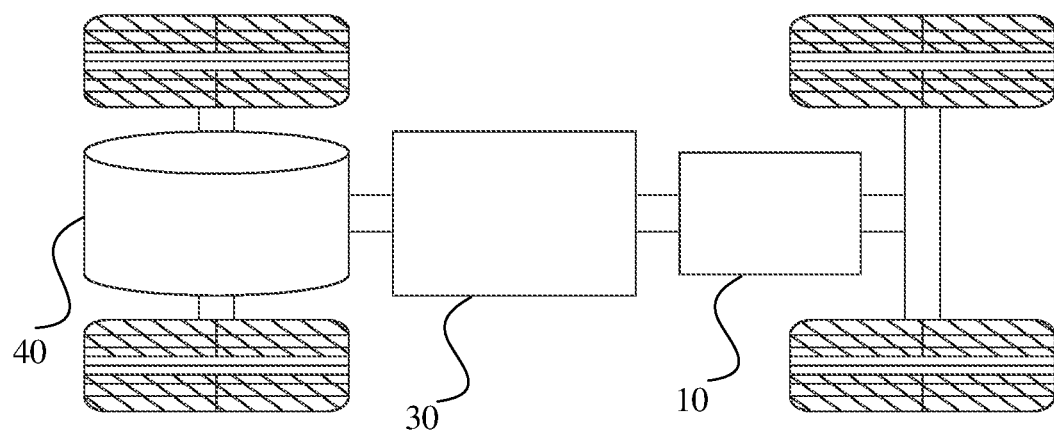
FIG. 1 is a schematic structural diagram of a vehicle disclosed in an embodiment of present application.

In the drawings, the drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise provided, "a plurality of" means more than two (including two); and orientations or positional relationships indicated by terms such as "up", "down", "left", "right", "inside", and "outside" are merely for convenience of describing the present application and for simplifying the description, rather than for indicating or implying that an indicated apparatus or element must have a specific orientation, and must be constructed and operated in a specific orientation, which thus may not be understood as a limitation the present application. In addition, the terms "first", "second", and "third" are merely used for a purpose of description, and shall not be understood as an indication or implication of relative importance. "Vertical" is not strictly vertical, but within an allowable range of error. "Parallel" is not strictly parallel, but within an allowable range of error.

The orientation words appearing in the following description are all directions shown in the drawings, and do not limit the specific structure of the present application. In the description of the present application, it should be further noted that, unless explicitly specified and defined otherwise, terms "installation", "interconnection", and "connection" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

In the present application, a battery cell may include a primary battery, a secondary battery, such as a lithium-ion battery, a lithium-sulfur battery, a sodium/lithium-ion battery, a sodium-ion battery or a magnesium-ion battery, which is not limited in the embodiments of the present application. The battery cells may be cylindrical, flat, and cuboid or in another shape, which is not limited by the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may include a battery cell group or a battery pack. The battery pack generally includes a box for encapsulating one or more battery cells. The box can prevent liquid or other foreign objects from affecting the charging or discharging of the battery cell.

The battery cell includes an electrode assembly and an electrolyte, and the electrode assembly includes a positive electrode sheet, a negative electrode sheet and a separator. The operation of a battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and serves as a positive tab. In an example of a lithium-ion battery, the material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and serves as a negative tab. A material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. A material of the separator may be PP, PE, or the like. In addition, the electrode assembly may be a coiled structure or a laminated structure, and the embodiments of the present application are not limited thereto. With the development of the battery technology, it is necessary to consider many design factors, such as energy density, cycle life, discharge capacity, C-rate and other performance parameters. In addition, the safety of the battery should also be considered. For a battery, a main safety hazard comes from the charging and discharging process, and in order to improve safety performance of the battery, a battery cell is generally provided with a pressure relief mechanism. The pressure relief mechanism refers to an element or component that is actuated when an internal pressure or temperature of the battery cell reaches a predetermined threshold, to relieve the internal pressure or temperature. The predetermined threshold may be adjusted according to different design requirements. The predetermined threshold may depend on the material of one or more of the positive electrode sheet, the negative electrode sheet, the electrolyte and the separator in the battery cell. The pressure relief mechanism may adopt, for example, a pressure-sensitive or temperature-sensitive element or component. That is, when the internal pressure or temperature of the battery cell reaches a predetermined threshold, the pressure relief mechanism is actuated, so as to form a channel for relieving the internal pressure or temperature.

The "actuation" mentioned in the present application means that the pressure relief mechanism acts, so that the internal pressure and temperature of the battery cell can be relieved. The action generated by the pressure relief mechanism may include but be not limited to: at least a portion of the pressure relief mechanism being fractured, torn or melted, and so on. After the pressure relief mechanism is actuated, high-temperature and high-pressure substances inside the battery cell are discharged outwards from the pressure relief mechanism as emissions. In this way, the pressure of the battery cell can be relieved at a controllable pressure or temperature, thereby avoiding potentially more serious accidents.

The emissions of the battery cell mentioned in the present application include but are not limited to: an electrolyte, dissolved or split positive and negative electrode sheets, fragments of a separator, high-temperature and high-pressure gas generated by reaction, flame, or the like.

The pressure relief mechanism on the battery cell has an important impact on the safety of the battery. For example, when short circuit, overcharge and other phenomena occur in the battery cell, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. In order to ensure an output voltage or current of the battery, the plurality of battery cells are often required to be electrically connected to each other via a bus component. The emissions discharged from the inside of the battery cell experiencing thermal runaway may cause short circuit of the other battery cells. For example, when discharged metal scraps are electrically connected to two bus components, part of the battery cells will be short-circuited, thereby posing a potential safety hazard.

In view of this, the embodiment of the present application is provided with a technical solution, the isolation component is used to separate the electrical chamber for accommodating the battery cell and the collection chamber for collecting the emissions. When the pressure relief mechanism is actuated, the emissions of the battery cell enter the collection chamber instead of the electrical chamber, or a small amount of the emissions enter the electrical chamber, so that the electrical connection component in the electrical chamber is not conductive and short-circuited, and therefore the safety of the battery can be enhanced. By providing the avoidance opening corresponding to the pressure relief mechanism of the battery cell group in the box of the battery, the pressure relief mechanism is prevented from being blocked, and the pressure relief mechanism is ensured to be able to smoothly discharge the emissions. At the same time, compared with the solution that each pressure relief mechanism is in one-to-one correspondence with each avoidance opening (this solution has extremely high requirements to assembly, if a cumulative tolerance of the assembly exceeds an allowable range, the pressure relief mechanism of some battery cells will not be aligned with the corresponding avoidance opening, thereby being blocked by the isolation component, therefore the emissions are not discharged smoothly when the pressure relief mechanism is actuated, and in extreme cases, the battery cell will explode because the pressure is not relieved in time). By providing the avoidance opening extending along the first direction, and making all of the plurality of pressure relief mechanisms of the battery cell group face the avoidance openings, the difficulty of aligning the pressure relief mechanism with the avoidance opening can be greatly reduced, thereby preventing the pressure relief mechanism from being blocked.

The isolation component is configured to isolate the electrical chamber from the collection chamber, such that the electrical chamber and the collection chamber are arranged on both sides of the isolation component. Optionally, the isolation component in the embodiment of the present application can also be used as a thermal management component, that is, the isolation component can contain a fluid to adjust the temperature of the plurality of battery cells. The fluid here may be liquid or gas, and the temperature adjustment means heating or cooling the plurality of battery cells. In the case of cooling or lowering the temperature of the battery cells, the isolation component is configured to contain the cooling fluid to lower the temperature of the plurality of battery cells. In addition, the isolation component can also be configured to heat so as to raise the temperature of the plurality of battery cells, the embodiment of the present application is not limited thereto. Optionally, the fluid may flow in a circulating manner to achieve a better temperature adjustment effect. Optionally, the fluid may be water, a mixture of water and ethylene glycol, air, or the like.

The electrical chamber mentioned in the present application is configured to accommodate a plurality of battery cells and a bus component. The electrical chamber may be sealed or unsealed. The electrical chamber provides an installation space for the battery cells and the bus component. In some embodiments, a structure configured to fix the battery cells may also be disposed in the electrical chamber. The shape of the electrical chamber may be determined according to the number and shape of the battery cells and the bus component which are accommodated therein. In some embodiments, the electrical chamber may be a cube with six walls. The bus component mentioned in the present application is configured to implement the electric connection among the plurality of battery cells, such as parallel connection, series connection or series-parallel connection. The bus component may implement the electrical connection among the battery cells by connecting electrode terminals of the battery cells. In some embodiments, the bus component may be fixed to the electrode terminals of the battery cells by means of welding.

The collection chamber mentioned in the present application is configured to collect the emissions, and may be sealed or unsealed. In some embodiments, the collection chamber may contain air or other gases. Optionally, the collection chamber may also contain a liquid, such as a cooling medium, or provide a component for accommodating the liquid to further lower the temperature of the emissions entering the collection chamber. Further, optionally, the gas or liquid in the collection chamber flows in a circulating manner.

The technical solutions described in the embodiments of the present application are all applicable to various apparatuses using batteries, such as mobile phones, portable apparatus, notebook computers, electro mobiles, electronic toys, electric tools, electric vehicles, ships and spacecrafts. For example, the spacecrafts include airplanes, rockets, space shuttles and spaceships, and the like.

It should be understood that the technical solutions described in the embodiments of the present application are not only applicable to the apparatus described above, but also applicable to all apparatus using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be disposed at the bottom, head or tail of the vehicle 1. The battery 10 may be used for power supply power to the vehicle 1. For example, the battery 10 may serve as an operation power source of the vehicle 1 for a circuit system of the vehicle 1, for example, for a working power demand of the vehicle 1 during startup, navigation and running. In another embodiment of the present application, the battery 10 may serve not only as an operation power source of the vehicle 1, but also as a driving power source of the vehicle 1, replacing or partially replacing fuel or natural gas to provide driving power for the vehicle 1.

In order to meet different power demands, the battery of the present application may be a battery cell group or a battery pack. The battery may include at least one battery cell group. The battery cell group includes a plurality of battery cells, where the plurality of battery cells may be electrically connected in series connection, parallel connection or series-parallel connection to form a battery, where the series-parallel connection refers to a combination of series connection and parallel connection. The battery may also be a battery pack. The plurality of battery cells may firstly be connected in series or in parallel or in series and parallel to form a battery cell group, and then the plurality of battery cell groups are connected in series or in parallel or in series and parallel to form a battery pack.

Figure 2:
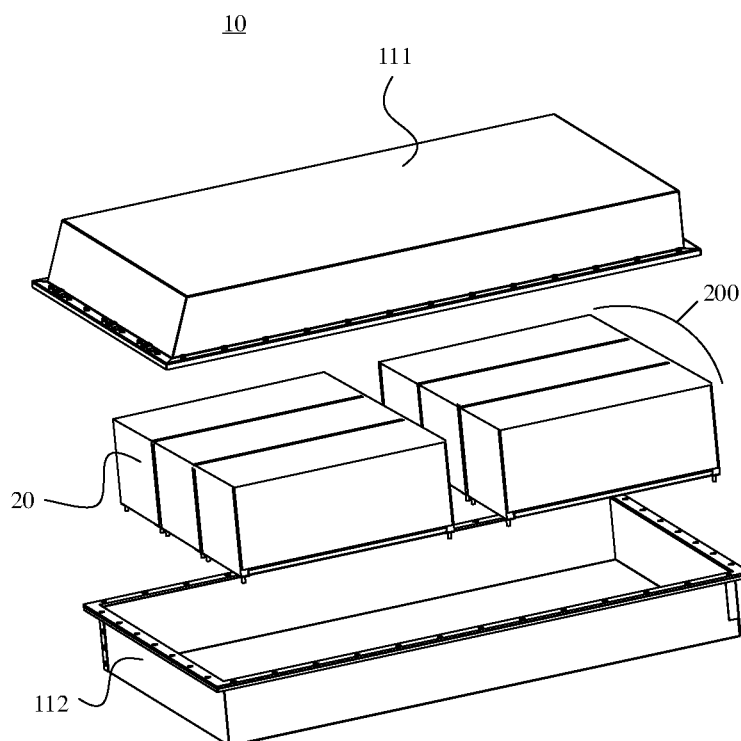
FIG. 2 is a schematic structural diagram of a battery disclosed in an embodiment of the present application.

For example, as shown in FIG. 2, FIG. 2 is a schematic structural diagram of a battery 10 according to an embodiment of the present application. The battery 10 may include at least one battery cell group 200. The battery cell group 200 includes a plurality of battery cells 20. The battery 10 may further include a box, inside of the box is a hollow structure, and the plurality of battery cells 20 are accommodated in the box. As shown in FIG. 2, the box may include two portions, which are referred to as a first portion 111 and a second portion 112, respectively, and the first portion 111 and the second portion 112 are fastened together. The shapes of the first portion 111 and the second portion 112 may be determined according to the shape of the combined battery cell groups 200. The first portion 111 and the second portion 112 each may be provided with an opening. For example, the first portion 111 and the second portion 112 each may be a hollow cuboid and each is provided with only one surface with an opening, and the opening of the first portion 111 is arranged opposite to the opening of the second portion 112. The first portion 111 and the second portion 112 are fastened to each other to form a box with a closed chamber. The plurality of battery cells 20 are combined in parallel connection or series connection or series-parallel connection and are then placed in the box formed by fastening the first portion 111 to the second portion 112.

Optionally, the battery 10 may also include other structures, which will not be described in detail herein. For example, the battery 10 may also include a bus component. The bus component is configured to implement electric connection among the plurality of battery cells 20, such as parallel connection, series connection or series-parallel connection. Specifically, the bus component may implement the electrical connection among the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism to pass through the box.

Figure 3:
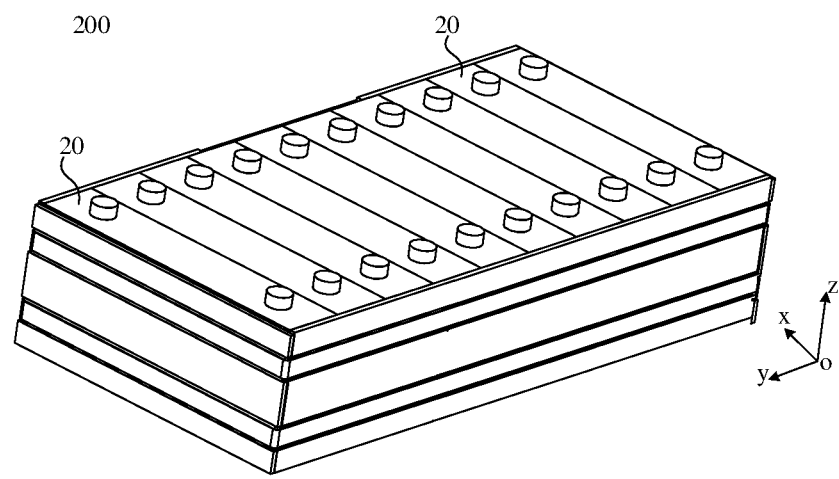
FIG. 3 is a schematic structural diagram of a battery cell group disclosed in an embodiment of the present application.

According to different power demands, the number of battery cells 20 in the battery cell group 200 may be set to any value. The plurality of battery cells 20 can be connected in series, in parallel or in series and parallel to achieve larger capacity or power. Since there may be many battery cells 20 included in each battery 10, the battery cells 20 are arranged in groups for convenience of installation, and each group of battery cells 20 constitutes a battery cell group 200. The number of the battery cell group 200 included in the battery module 200 is not limited and may be set according to demands. For example, FIG. 3 is an example of the battery cell group 200. The battery may include a plurality of battery cell groups, and these battery cell groups may be connected in series, in parallel or in series and parallel.

Figure 4:
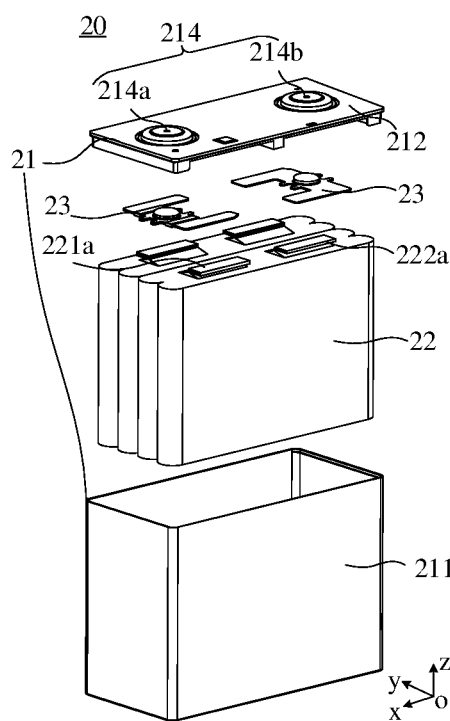
FIG. 4 is an exploded view of a battery cell disclosed in an embodiment of the present application.

As shown in FIG. 4, FIG. 4 is a schematic structural diagram of a battery cell 20 according to an embodiment of the present application. The battery cell 20 includes one or more electrode assemblies 22, a housing 211 and a cover plate 212. A shell 21 is formed with the housing 211 and the cover plate 212. A wall of the housing 211 and the cover plate 212 are each referred to as a wall of the battery cell 20. The housing 211 is shaped according to a shape of the one or more electrode assemblies 22 after combination. For example, the housing 211 may be a hollow cuboid or cube or cylinder, and one surface of the housing 211 is provided with an opening, so that the one or more electrode assemblies 22 may be placed in the housing 211. For example, when the housing 211 is a hollow cuboid or cube, one plane of the housing 211 is an opening surface, that is, the plane does not have a wall, so that the inside and outside of the housing 211 are in communication with each other. When the housing 211 is a hollow cylinder, an end face of the housing 211 is an opening face, that is, the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in a shape of a flat plate, and the two electrode terminals 214 are fixed on a flat plate face of the cover plate 212. The two electrode terminals 214 are a positive electrode terminal 214a and a negative electrode terminal 214b, respectively. Each of electrode terminals 214 is correspondingly provided with a connecting member 23, which is disposed between the cover plate 212 and the electrode assembly 22. The connecting member 23 is configured to achieve the electrical connection between the electrode assembly 22 and the electrode terminal 214.

As shown in FIG. 4, each of the electrode assembles 22 is provided with a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of the one or more electrode assemblies 22 is connected to one electrode terminal through one connecting member 23, and the second electrode tab 222a of the one or more electrode assemblies 22 is connected to the other electrode terminal through the other connecting member 23. For example, the positive electrode terminal 214a is connected to the positive electrode tab through one connecting member 23, and the negative electrode terminal 214b is connected to the negative electrode tab through the other connecting member 23.

In the battery cell 20, according to actual use demands, there may be a single electrode assembly 22 or a plurality of electrode assemblies 22. As shown in FIG. 4, four separate electrode assemblies 22 are disposed in the battery cell 20.

Figure 5:
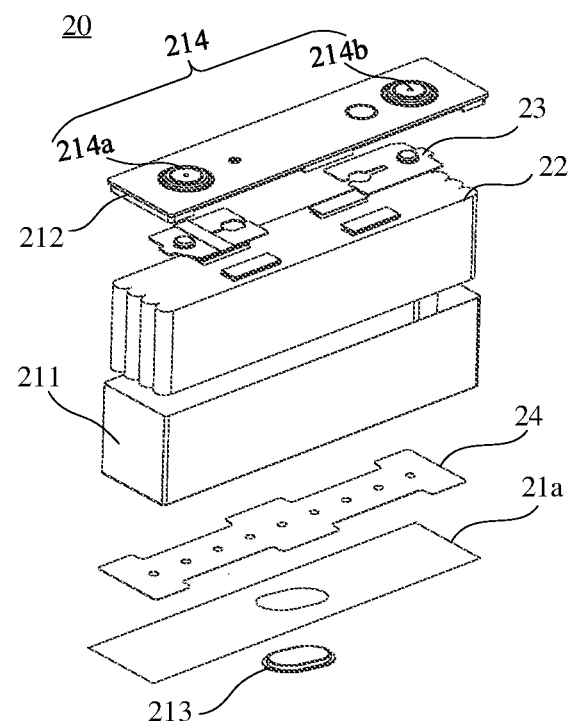
FIG. 5 is an exploded view of a battery cell disclosed in another embodiment of the present application.

As shown in FIG. 5, FIG. 5 is a schematic structural diagram of a battery cell 20 provided with a pressure relief mechanism 213 according to another embodiment of the present application.

The housing 211, the cover plate 212, the electrode assembly 22 and the connecting member 23 in FIG. 5 are consistent with the housing 211, the cover plate 212, the electrode assembly 22 and the connecting member 23 in FIG. 4, which will not be repeated here for brevity.

One wall of the battery cell 20, such as a first wall 21a shown in FIG. 5, may be further provided with a pressure relief mechanism 213. In FIG. 5, the first wall 21a is separated from the housing 211, that is, a bottom side of the housing 211 is provided with an opening, the first wall 21a covers the opening on the bottom side and is connected to the housing 211, and the connection manner may be welding or connecting with an adhesive. Alternatively, the first wall 21a and the housing 211 may also be a one-body structure. The pressure relief mechanism 213 is configured to be actuated when the internal pressure or temperature of the battery cell 20 reaches a threshold, to relieve the internal pressure or temperature.

The pressure relief mechanism 213 may be a part of the first wall 21a, or may be a separate structure from the first wall 21a, and fixed to the first wall 21a by means of welding, for example. When the pressure relief mechanism 213 is a part of the first wall 21a, for example, the pressure relief mechanism 213 can be formed by providing an indentation on the first wall 21a, and a thickness of the first wall 21a corresponding to the indentation is less than that of other regions of the pressure relief mechanism 213 other than the indentation. The indentation is the weakest position of the pressure relief mechanism 213. When excessive gas generated by the battery cell 20 causes an internal pressure of the housing 211 to rise and reach a threshold, or heat generated by the internal reaction of the battery cell 20 causes an internal temperature of the battery cell 20 to rise and reach a threshold, the pressure relief mechanism 213 may be fractured at the indentation, resulting in the communication between the inside and outside of the housing 211. The gas pressure and temperature are released outward through the cracking of the pressure relief mechanism 213, thereby preventing the battery cell 20 from exploding.

Optionally, in an embodiment of the present application, as shown in FIG. 5, in a case where the pressure relief mechanism 213 is disposed on the first wall 21a of the battery cell 20, a second wall of the battery cell 20 is provided with electrode terminals 214, and the second wall is different from the first wall 21a.

Optionally, the second wall is arranged opposite to the first wall 21a. For example, the first wall 21a may be a bottom wall of the battery cell 20, and the second wall may be the cover plate 212 of the battery cell 20.

Optionally, as shown in FIG. 5, the battery cell 20 may further include a backing plate 24. The backing plate 24 is located between the electrode assembly 22 and a bottom wall of the housing 211, may play a role of supporting the electrode assembly 22, and may also effectively prevent the electrode assembly 22 from interfering with rounded corners of a periphery of the bottom wall of the housing 211. In addition, one or more through holes may be disposed on the backing plate 24. For example, a plurality of through holes uniformly arranged may be provided, or when the pressure relief mechanism 213 is disposed on the bottom wall of the housing 211, a through hole is disposed at a position corresponding to the pressure relief mechanism 213, so as to facilitate conduction of an electrolytic solution or gas. Specifically, this can communicate spaces of an upper surface and a lower surface of the backing plate 24, and gas generated inside the battery cell 20 and the electrolytic solution can freely pass through the backing plate 24.

The pressure relief mechanism 213 and the electrode terminals 214 are disposed on different walls of the battery cell 20, so that when the pressure relief mechanism 213 is actuated, the emissions of the battery cell 20 may be farther away from the electrode terminals 214, thereby reducing the impact of the emissions on the electrode terminals 214 and the bus component and therefore the safety of the battery can be enhanced.

Further, when the electrode terminals 214 are disposed on the cover plate 212 of the battery cell 20, the pressure relief mechanism 213 is disposed on a bottom wall of the battery cell 20, so that when the pressure relief mechanism 213 is actuated, the emissions of the battery cell 20 may be are discharged to a bottom of the battery 10. In this way, on one hand, a risk of the emissions may be reduced by using an isolation component at the bottom of the battery 10, and on the other hand, the bottom of the battery 10 is usually away from a user, thereby reducing harm to the user.

The pressure relief mechanism 213 may be in various possible pressure relief structures, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when the internal gas pressure of the battery cell 20 provided with the pressure relief mechanism 213 reaches a threshold.

In some design solutions of the pressure relief mechanism of current batteries, there are still existing problems, such as the emissions cannot be discharged because of some blocked pressure relief mechanisms, complicated design solutions, installation difficulties, and the like. Embodiments of the present application is provided with the box of the battery, the isolation component is used to separate the electrical chamber for accommodating the battery cell and the collection chamber for collecting the emissions. When the pressure relief mechanism is actuated, the emissions of the battery cell enter the collection chamber instead of the electrical chamber, or a small amount of the emissions enter the electrical chamber, so that the electrical connection component in the electrical chamber is not conductive and short-circuited, and therefore the safety of the battery can be enhanced. By providing the avoidance opening corresponding to the pressure relief mechanism of the battery cell group in the box of the battery, the pressure relief mechanism is prevented from being blocked, and the pressure relief mechanism is ensured to be able to smoothly discharge the emissions. At the same time, compared with the solution that each pressure relief mechanism is in one-to-one correspondence with each avoidance opening (this solution has extremely high requirements to assembly, if a cumulative tolerance of the assembly exceeds an allowable range, the pressure relief mechanism of some battery cells will not be aligned with the corresponding avoidance opening, thereby being blocked by the isolation component, therefore the emissions are not discharged smoothly when the pressure relief mechanism is actuated, and in extreme cases, the battery cell will explode because the pressure is not relieved in time). By providing the avoidance opening extending along the first direction, and making all of the plurality of pressure relief mechanisms of the battery cell group face the avoidance openings, the difficulty of aligning the pressure relief mechanism with the avoidance opening can be greatly reduced, thereby preventing the pressure relief mechanism from being blocked.

Figure 6:
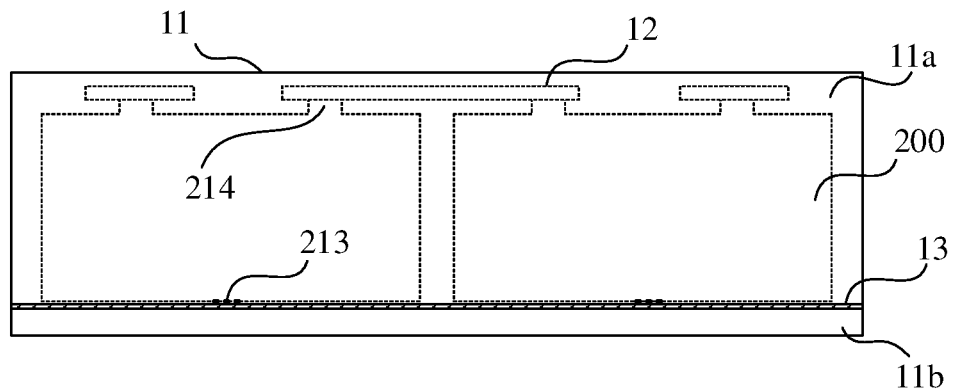
FIG. 6 is a schematic structural diagram of a battery disclosed in an embodiment of the present application.

FIG. 6 is a schematic structural diagram of a battery in an embodiment of the present application. As shown in FIG. 6, the box 11 may include an electrical chamber 11a, a collection chamber 11b, and an isolation component 13. The isolation component 13 is configured to isolate the electrical chamber 11a from the collection chamber 11b. The so-called "isolation" here refers to separation, which may or may not be sealed.

The electrical chamber 11a is configured to accommodate the battery cell group 200, where the battery cell group 200 includes the plurality of battery cells 20 arranged along the first direction. Optionally, the first direction may be orientation of a single row or single column. The battery cell group 200 is provided with an accommodating space by the electrical chamber 11a, and a shape of the electrical chamber 11a may be determined according to the battery cell group 200.

Optionally, the electrical chamber 11a may also be configured to accommodate a bus component 12. The bus component 12 is configured to implement electrical connection among the plurality of battery cells 20. The electrical connection among the plurality of battery cells 20 may be implemented by the bus component 12 connecting electrode terminals 214 of the battery cells 20.

At least two battery cells 20 of the plurality of battery cells may include a pressure relief mechanism 213. The pressure relief mechanism 213 is disposed on a first wall 21a of the battery cell 20. The pressure relief mechanism 213 is configured to be actuated when the internal pressure or temperature of the battery cell 20 reaches a threshold value to relieve the internal pressure For convenience of description, the battery cell 20 involved in the following description about the pressure relief mechanism 213 refers to the battery cell 20 provided with the pressure relief mechanism 213. For example, the battery cell 20 may be the battery cell 20 in FIG. 5.

The collection chamber 11b is configured to collect the emissions of the battery cell 20 provided with the pressure relief mechanism 213 when the pressure relief mechanism 213 is actuated.

The isolation component 13 is configured to isolate the electrical chamber 11a from the collection chamber 11b, such that the electrical chamber 11a and the collection chamber 11b are arranged on both sides of the isolation component 13.

In the embodiment of the present application, the isolation component 13 is adopted to isolate the electrical chamber 11a from the collection chamber 11b. That is, the electrical chamber 11a for accommodating the battery cell group 200 is separated from the collection chamber 11b. In this way, when the pressure relief mechanism 213 is actuated, the emissions of the battery cell 20 enter the collection chamber 11b instead of the electrical chamber 11a, or a small amount of emissions enter the electrical chamber 11a, so that the electrical connection in the electrical chamber 11a is not affected, and therefore the safety of the battery can be enhanced.

Optionally, the inside of the isolation component 13 is provided with a flow channel, and the flow channel is configured to contain a fluid such that the isolation component 13 adjusts the temperature for the battery cell 20. Specifically, the isolation component 13 may include a flow channel made of a thermally conductive material. The fluid flows in the flow channel, and transfer heat through the heat-conducting material, thereby cooling or heating the battery cell 20. Optionally, the fluid may flow in a circulating manner to achieve a better temperature adjustment effect.

Optionally, the isolation component 13 of the embodiment of the present application is configured to be capable of being damaged when the pressure relief mechanism 213 is actuated, such that the fluid is discharged from the inside of the isolation component 213. Specifically, when the pressure relief mechanism 213 is actuated, the isolation component 13 is damaged, and the fluid is discharged from the inside of the isolation component 13. Thus, the heat of the battery cell 20 can be absorbed and the temperature of the emissions is reduced, thus the risk resulting from the emissions is reduced. In this case, the fluid enters the collection chamber 11b together with the emissions cooled by the fluid. Thanks to the cooling by the fluid, the temperature of the emissions of the battery cell 20 can be quickly reduced, and thus the risk of the emissions entering the collection chamber 11b is greatly reduced. The emissions do not have a great impact on other parts of the battery (such as other battery cells 20), so that the destructiveness caused by the abnormality of a single battery cell 20 can be suppressed as soon as possible, and the possibility of battery explosion can be reduced.

It should be understood that, in addition to providing the isolation component 13 with a structure that the isolation component 13 can be damaged when the pressure relief mechanism 213 is actuated, the pressure relief mechanism 213 may be also provided with a damage apparatus, and the damage apparatus is configured to damage the isolation component 13 when the pressure relief mechanism 213 is actuated, such that the fluid is discharged from the inside of the isolation component 13. For example, the breaking apparatus may be a spike, but the embodiment of the present application is not limited thereto.

In order to ensure that the pressure relief mechanism can be opened smoothly such that the battery cell can discharge the emissions. A surface of the isolation component 13 of the present application that is close to the battery cell group 200 can be provided with an avoidance opening. The avoidance opening extends along the first direction where arranging the plurality of battery cells 20. And all of the pressure relief mechanisms corresponding to the plurality of battery cells 20 in the battery cell group 200 face the avoidance opening, that is, the avoidance opening may cover all of the pressure relief mechanisms of the battery cell group 200.

The avoidance opening of the embodiment of the present application may be configured to provide a deformation space for the pressure relief mechanism 213, such that the pressure relief mechanism 213 deforms and ruptures in a direction close to the isolation component 13 when the internal pressure and temperature of the battery cell reaches a threshold value.

The pressure relief mechanism 213 is provided with the deformation space by the avoidance opening, so the pressure relief mechanism 213 of the embodiment of the present application may rupture in the deformation space when the internal pressure or temperature of the battery cell 20 reaches the threshold, which prevent the pressure relief mechanism 213 from being block, thereby ensuring the discharge of its emissions, and thus, the safety of the battery is enhanced. At the same time, the avoidance opening of the embodiment of the present application may cover all of the pressure relief mechanisms 213 of the battery cell group 200. Compared with the solution that each pressure relief mechanism is in one-to-one correspondence with each avoidance opening, the avoidance opening extends along the first direction, so all of the pressure relief mechanisms 213 in the battery cell group face the avoidance opening, and thus the difficulty of aligning the pressure relief mechanism with the avoidance opening can be greatly reduced, thereby preventing the pressure relief mechanism from being blocked.

Optionally, the avoiding opening in the embodiment of the present application may be a recess or a through hole, and the recess or the through hole can provide a deformation space for the pressure relief mechanism 213, such that the pressure relief mechanism 213 can rapture smoothly and discharge the emissions when it is actuated.

As an embodiment, a width of the avoidance opening of the embodiment of the present application along a second direction is associated with a width of the pressure relief mechanism 213 along the second direction. Specifically, the width of the avoidance opening along the second direction is greater than the width of the pressure relief mechanism 213 along the second direction, where the second direction is perpendicular to the first direction.

The following describes the cases where the avoidance opening in the embodiments of the present application are configured as a recess or a through hole.

Figure 7:
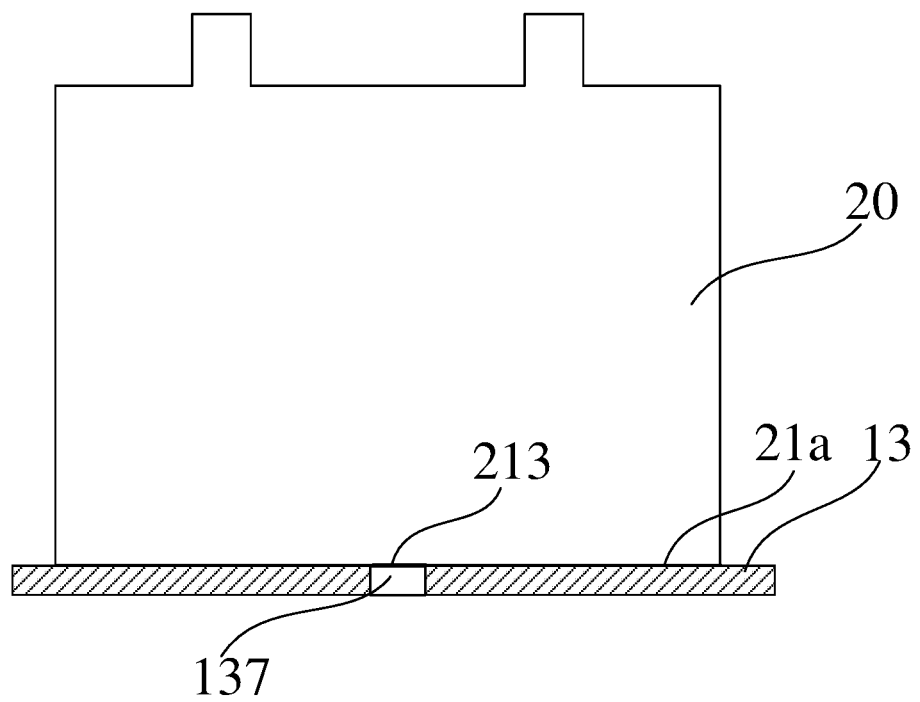
FIG. 7 is a schematic cross-sectional view of an avoidance opening being a through hole in an embodiment of the present application.

FIG. 7 shows a schematic cross-sectional view of an avoidance opening disposed on the isolation component 13 being a through hole in an embodiment of the present application. As shown in FIG. 7, on the isolation component 13 is provided with a though hole 137. On the one hand, the through hole 137 may be the avoidance opening, on the other hand, the emissions of the battery cell 20 provided with the pressure relief mechanism 213 can enter the collection chamber 11b though the through hole 137 when the pressure relief mechanism 213 is actuated.

As an embodiment, the through hole 137 may be arranged opposite to the pressure relief mechanism 213. In this way, when the pressure relief mechanism 213 is actuated, the emissions may directly enter the collection chamber 11b through the through hole 137.

Optionally, the isolation component 13 is only provided with one through hole 137, and the one through hole 137 corresponds to all of the pressure relief mechanisms of the battery cell group 200. By providing the through hole 137 corresponding to the pressure relief mechanism 213, a deformation space can be provided for the pressure relief mechanism 213, so that when the pressure relief mechanism 213 is actuated, the emissions can be discharged into the collection chamber 11b through the through hole 137. It is mentioned above that the inside of the isolation component 13 can contain a fluid, and, the isolation component 13 can be damaged when the pressure relief mechanism 213 is actuated, such that the fluid is discharged from the inside of the isolation component 13. Corresponding to the situation that the isolation component 13 may be damaged, in an embodiment of the application, when the avoidance opening of the isolation component 13 is configured to be a through hole 137, a part around the isolation component 13 can be damaged by the emissions of the battery cell 20 provided with the pressure relief mechanism 213, such that the fluid is discharged from the inside of the isolation component 13.

Specifically, when the pressure relief mechanism 213 is actuated, the emissions of the battery cell 20 enter the collection chamber 11b through the through hole 137. In addition, the emissions also damage the parts around the through hole 137. For example, the hot emissions melt the isolation component 13 around the through hole 137, so that the fluid is discharged from the inside of the isolation component 13, thereby cooling the hot emissions.

Optionally, in an embodiment of the present application, a hole wall of the through hole 137 can be damaged by the emissions of the battery cell 20 provided with the pressure relief mechanism 213, such that the fluid is discharged from the inside of the isolation component 13.

When the pressure relief mechanism 213 is actuated, the emissions of the battery cell 20 rush into the through hole 137, Since the emissions have high pressure and high heat, the emissions further melt the hole wall of the through hole 137 when passing through the through hole 137, so that the fluid is discharged from the inside of the isolation component 13, thereby cooling the emissions.

Optionally, the hole wall of the through hole 137 is inclined in the axial direction. Specifically, the diameter of the through hole 137 gradually becomes smaller along the discharging direction of the emissions, so that the contact area with the discharge can be increased, which is more convenient. The hole wall of the through hole 137 is damaged by the emissions.

Optionally, the through hole 134a is configured to meet the condition that the pressure relief mechanism 213 can be opened when actuated. As an embodiment of the present application, the area of an opening of the through hole 137 is associated with the area of the pressure relief mechanism 213. In order that the pressure relief mechanism 213 can be opened, a ratio of the area of the opening of the through hole 137 to the area of the pressure relief mechanism 213 needs to be greater than a certain value. In addition, in order to facilitate the damage to the side wall of the through hole 137 by the emissions, the ratio of the area of the opening of the through hole 137 to the area of the pressure relief mechanism 213 also needs to be less than a certain value.

Figure 8:
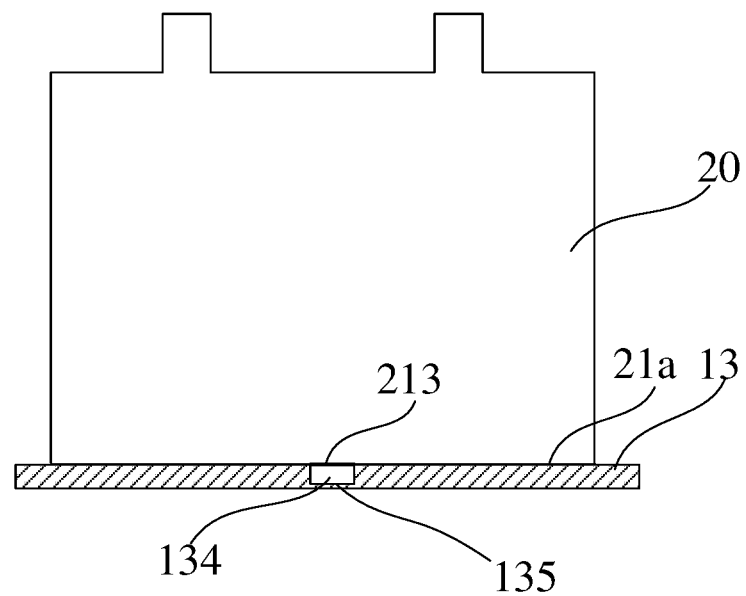
FIG. 8 is a schematic cross-sectional view of an avoidance opening being a recess in an embodiment of the present application.

FIG. 8 shows a schematic cross-sectional view where the avoidance opening provided by the isolation component 13 being a recess in an embodiment of the present application. As shown in FIG. 8, the isolation member 13 is provided with a recess 134 which is arranged opposite to the pressure relief mechanism 213.

Optionally, a depth of the recess 134 may be greater than or equal to 2 mm, so as to provide sufficient deformation space for the pressure relief mechanism and facilitate the actuation of the pressure relief mechanism.

As an embodiment, the bottom wall of the recess 134 can be provided with at least one exhaust hole, the emissions of the battery cell 20 provided with the pressure relief mechanism 213 can enter the collection chamber 11b through the above exhaust hole.

Optionally, there are a plurality of the above configured exhaust holes, and each exhaust hole is arranged opposite to a corresponding pressure relief mechanism 213.

The bottom wall of the recess 134 is provided with the exhaust hole, so that the emissions, discharged by the pressure relief mechanism 213 when it is actuated, is discharged to the collection chamber 11b, preventing or reducing the emissions form entering the electrical chamber 11a, thereby improving the safety performance of the battery.

Figure 9A:
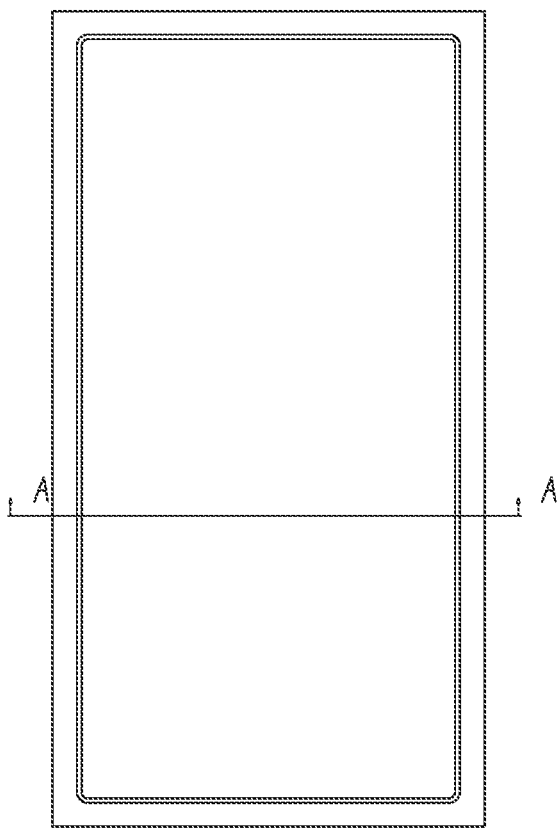
FIG. 9a is a plan schematic diagram of a battery disclosed in an embodiment of the present application.
Figure 9B:
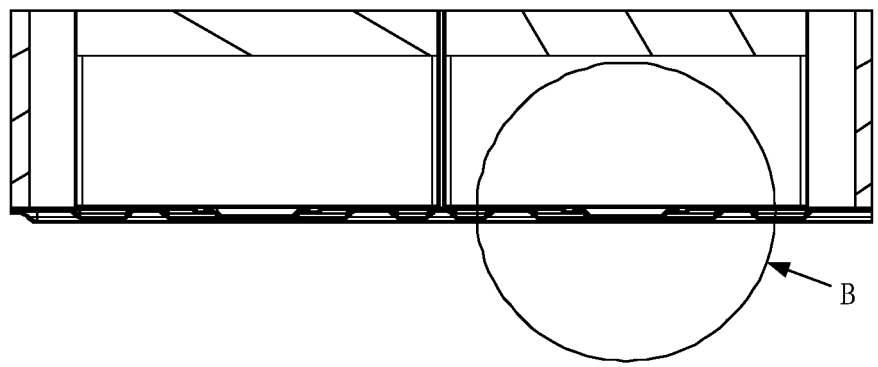
FIG. 9b is a schematic sectional view of the battery shown in FIG. 9a taken along A-A.
Figure 9C:
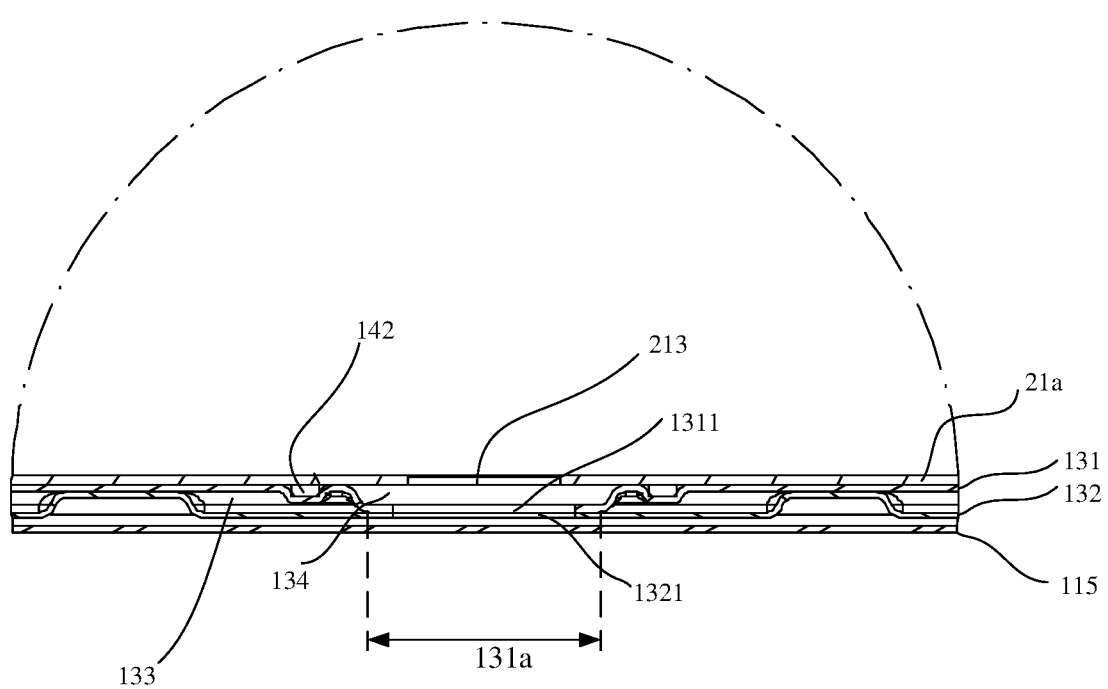
FIG. 9c is an enlarged view of a part B of the battery shown in FIG. 9b.

The isolation component 13 of the embodiment of the present application described above can contain the fluid, and the isolation component 13 being able to contain the embodiment of the present application will described below. As an embodiment, the isolation component 13 of the embodiment of the present application may include a first plate and a second plate. As shown in FIGS. 9a to 9c, where FIG. 9a is a plan schematic diagram of a battery in an embodiment of the present application, FIG. 9b is sectional view of the box along A-A' of an embodiment of the present application, and FIG. 9c is an partially detailed view corresponding to FIG. 9B.

Optionally, the first plate and the second plate in the embodiment of the present application may be thermally conductive plates. Specifically, the material of the first plate and the second plate is metal, for example, aluminum or steel.

As shown in FIG. 9c, a flow channel 133 can formed with the first plate 131 and the second plate 132, configured to contain the fluid. The first plate 131 is disposed on one side of the second plate 132 that is close to the electrical chamber 11b, and attached to the first wall 21a. A first region 131a of the first plate 131 is recessed toward the second plate 132 to form a recess 134, and the first region 131a is connected to the plate 132. In this way, a flow channel 133 is formed around the recess 134, and there is no flow channel in the bottom wall of the recess 134, so as to be damaged by the emissions of the pressure relief mechanism.

As described above, when the avoidance opening of the isolation component 13 is the recess 134, at least one exhaust hole may be provided on the bottom wall of the recess 134. In the case that the isolation component 13 in the embodiment of the present application is provided with a first plate 131 and a second plate 131, as shown in FIG. 9c, a cross-sectional view of the first exhaust hole 1311 provided on the first plate 131 and the second exhaust hole 1321 provided on the second plate 132 is shown. Optionally, the first exhaust hole 1311 and the second exhaust hole 1321 may be configured to the same size.

It should be understood that the first exhaust hole 1311 and the second exhaust hole 1321 may jointly constitute the exhaust hole provided on the recess 134 described above.

The following is a specific embodiment in which an exhaust hole is provided on the bottom wall of the recess 134 of the isolation member 13.

Figure 10A:
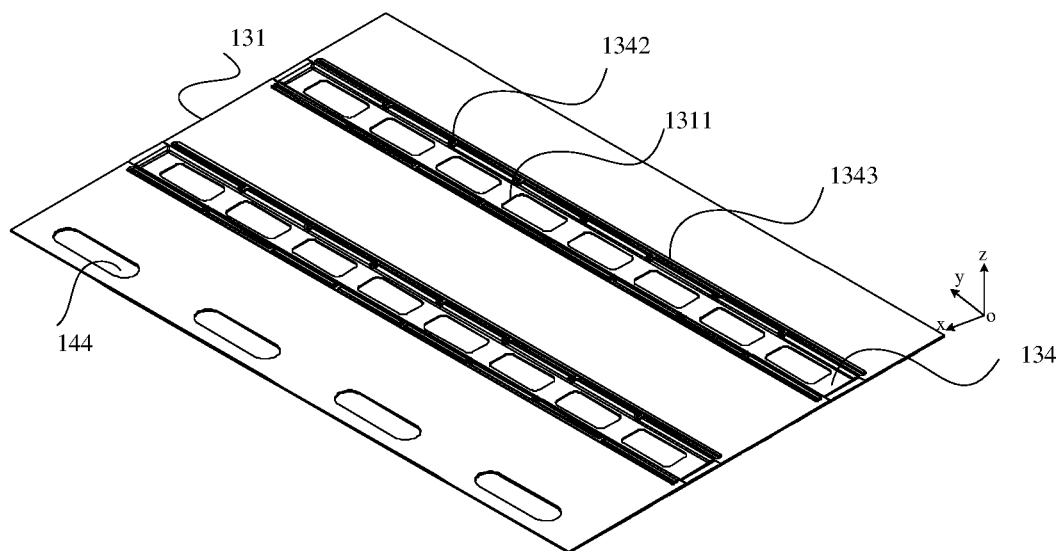
FIG. 10a is a schematic three-dimensional view of an isolation component disclosed in an embodiment of the present application.
Figure 10B:
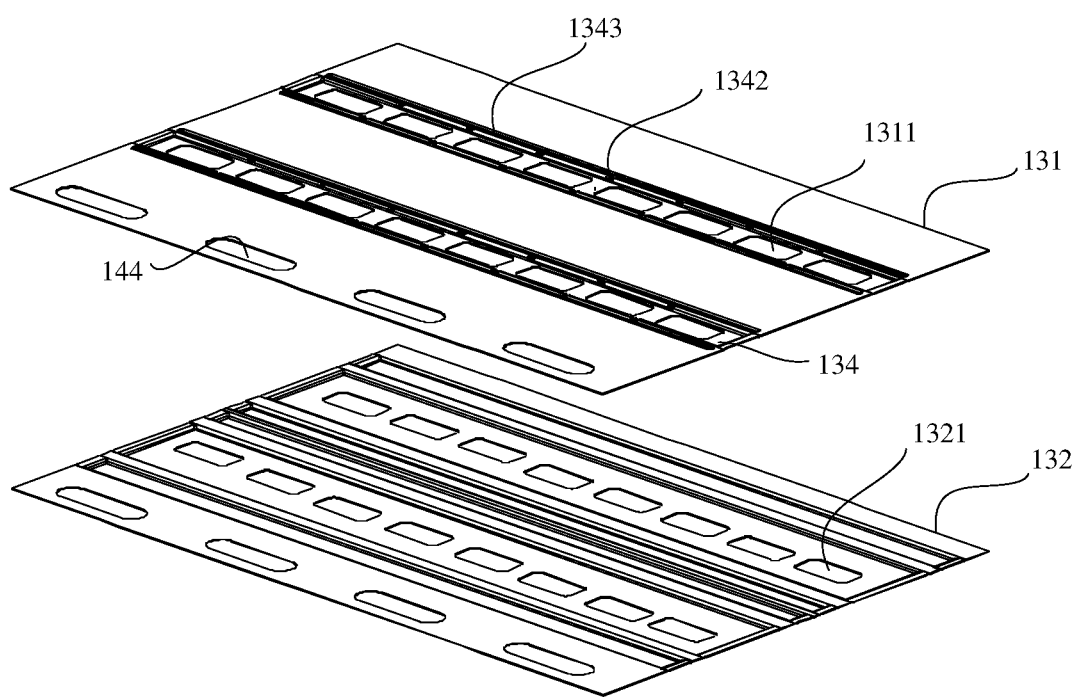
FIG. 10b is an exploded view of an isolation component disclosed in an embodiment of the present application.

FIG. 10a to FIG. 10b show a schematic structural diagram of an isolation component 13 of an embodiment of the present application. As shown in FIG. 10a, the first plate 131 is recessed to form a recess 134 that extends along the first direction and may correspond to the pressure relief mechanisms 213 of the battery cells 20 of the battery cell group 200. Optionally, the recess 134 may correspond to the pressure relief mechanism 213 of all the battery cells 20 of the battery cell group 200.

As described above, when the isolation member 13 includes the first plate 131 and the second plate 132, corresponding to FIG. 9c, a first exhaust hole 1311 may be provided to the first area 131a of the first plate 131, as shown in FIG. 10a. There may be one first exhaust hole 1311. For example, the first region 131a may be provided with only one first exhaust hole 1311 extending along the first direction. In this case, the first exhaust hole 1311 may correspond to a battery cell group. All of the pressure relief mechanisms 213 of the battery cell group 200, or, a plurality of first exhaust holes 1311 may be provided on the first region 131a, and the plurality of first exhaust holes 1311 are arranged at intervals in the first direction. For example, the number of the provided first exhaust holes 1311 may be the same as the number of the pressure relief mechanism 213 of the battery cell group 200. In this way, each first exhaust 1311 can be in one-to-one correspondence with the corresponding pressure relief mechanism 213, thereby ensuring that the emissions can be smoothly discharged from the pressure relief mechanism 213. FIG. 10a only shows the one-to-one correspondence among the plurality first exhaust holes 1311 and the pressure relief mechanisms 213, but the embodiment of the present application is not limited thereto.

Optionally, as an implementation manner, the position that the second plate 132 corresponding to the first exhaust hole 1311 may be provided with a second exhaust hole 1321. The first exhaust hole 1311 and the second exhaust hole 1321 may be configured to be the same.

The bottom wall of the recess 134 is provided with exhaust hole, such that the emissions can be smoothly discharged when the pressure relief mechanism 213 is actuated.

As an embodiment, in order to ensure the isolation between the electrical chamber 11a and the collection chamber 11b, the first exhaust hole 1311 may be sealed by the sealing layer and/or the second exhaust hole 1321 may be sealed by the sealing layer, and the a thickness of the sealing layer may be 0.05 mm-0.3 mm. Optionally, the sealing layer may be polyester resin (PET), polypropylene (PP) and the like, so as to achieve the sealing of the isolation member 13. It should be understood that the way of setting the sealing layer here may be to seal the aforementioned PET or PP material at the position of the hole of the exhaust hole, and the embodiment of the present application does not limit the specific implementation manner.

As an embodiment, under the condition that the first plate 131 is provided with the first exhaust hole 1311, the second vent 1321 may not be provided on the second plate 132. Optionally, a weakened zone can be formed by thinning the zone corresponding to the first exhaust hole 1311, so that the emissions from the pressure relief mechanism 213 breaks through the weakened zone and is discharged into the collection chamber 11b. Specifically, a thickness of a region of the second plate 132 corresponding to the first exhaust hole 1311 is less than a thickness of other regions of the second plate 132.

A position of the second plate 132 corresponding to the first exhaust hole 1311 is provided with a smaller thickness, such that the internal temperature or pressure of the pressure relief mechanism 213 can break through the isolation component 13 more easily and enter the collection chamber 11b.

In addition to the above-mentioned form of providing exhaust holes on the bottom wall of the recess 134, the embodiment of the present application can also provide a weakened zone on the bottom wall of the recess 134 such that the internal pressure or temperature of the pressure relief mechanism 213 can break through the isolation member 13 and enter the collection chamber 11b.

As an implementation manner, as shown in FIG. 8, FIG. 8 is a schematic diagram of the weakened zone 135 provided on the bottom wall of the recess 134 in the embodiment of the present application. When the weakened zone 135 is disposed on the bottom wall, since the bottom wall of the recess 134 is weaker than other regions of the isolation component 13, it is easily damaged by the emissions. When the pressure relief mechanism 213 is actuated, the emissions can break the bottom wall of the recess 134 and enter the collection chamber 11b.

When the weakened zone 135 is provided, optionally, the first plate 131 and the second plate 132 are not provided with exhaust holes, but are provided at the same time to form the weakened zone 135. Or optionally, the first plate 131 may be provided with a first exhaust hole 1311, and the second plate 132 is provided with a weakened zone 135 instead of a second exhaust hole 1321 at the region corresponding to the recess 134. In this way, after the first plate 131 and the second plate 132 are connected, a weakened zone 135 is formed on the bottom wall of the recess 134 to facilitate the emissions of the pressure relief mechanism 213 to break through the isolation component 13.

It should be understood that the bottom wall of the recess 134 can be thinned by other thinning methods. For example, a blind hole or a stepped hole formed in the first region 131*a* of the first plate 131; and/or a blind hole is formed in the second plate.

In an embodiment of the present application, a thickness of the weakened zone 135 is less than or equal to 3 mm. For example, the thickness of the weakened zone 135 may be 1 mm or less.

In addition to the weakened zone 135 with a smaller thickness, a weakened zone 135 made of a low-melting-point material may also be used to facilitate the melting thereof by the emissions. That is, the weakened zone 135 may have a lower melting point than the rest part of the isolation component 13. For example, the material of the weakened zone 135 has a melting point below 400° C.

It should be understood that the weakened zone 135 may be configured to be made of a low-melting-point material and with a smaller thickness. That is, the foregoing two implementation manners may be implemented alone or in combination.

According to the above description, the isolation component 13 may be damaged when the pressure relief mechanism 213 is actuated, such that the fluid is discharged from the inside of the isolation component 13. In an embodiment of the present application, a part of the isolation component 13 around the weakened zone 134 may be damaged by the emissions of the battery cell 20 provided with the pressure relief mechanism 213, such that the fluid is discharged from the inside of the isolation component 13.

Specifically, when the isolation component 13 is provided with a recess 134, a side surface of the recess 134 can be damaged by the emissions of the battery cell 20 provided with the pressure relief mechanism 213, such that the fluid is discharged from the inside of the isolation component 13.

In the case of adopting the recess 134, when the pressure relief mechanism 213 is actuated, the emissions of the battery cell 20 rush into the recess 134. Since the bottom wall of the recess 134 is relatively weak, the emissions will damage the bottom wall of the recess 134 and enter the collection chamber 11*b*. In addition, the emissions rushing into the recess 134 also melt the side face of the recess 134, so that the fluid is discharged from the inside of the isolation component 13, thereby cooling the hot emissions.

As an embodiment, a side wall of the recess 134 is an inclined plane. This can increase the contact area with the emissions and facilitate the damage by the emissions. For example, an inclination angle of the side face of the recess 134 (an included angle between the side face and the plane where the bottom wall is located) may be in the range from 15° to 85°.

Or, as another embodiment, the side wall of the recess 134 may be a vertical surface, but the application is not limited thereto.

As an embodiment, when the pressure relief mechanism 213 described above in the embodiment of the present application is actuated, the emissions enter the collection chamber 11*b* through the isolation component 13. In order to further reduce the influence of the emissions on the external environment, the isolation component 13 of the embodiment of the present application may also be provided with a second through hole 144, and the emissions that enters the collection chamber 11*b* may be discharged through the second through hole.

Specifically, the emissions may be in communication with the exhaust channel through the second through hole 144, and finally discharged out of the box 11 though the exhaust channel. By providing the second through hole 144 on the isolation component 13, which can further extend the path of discharging the emissions, further reduce the temperature of the exhaust, thereby reducing the influence of the emissions on the external environment of the battery 10.

Since the recess 134 in the embodiment of the present application may correspond to the plurality of pressure relief mechanisms 213 of the plurality battery cells 20 of the battery cell group 200, the emissions of the plurality pressure relief mechanisms 213 are all discharged through the recess 134. In this case, when the pressure relief mechanism 213 of one battery cell 20 is activated, its emissions may impact the adjacent battery cells 20, causing the adjacent battery cells 20 to be damaged. On such basis, the battery box body of in the embodiment of the present application may further include a gas blocking bar. By providing the gas blocking bar, the mutual influence among the adjacent battery cells 20 is reduced.

Figure 11:
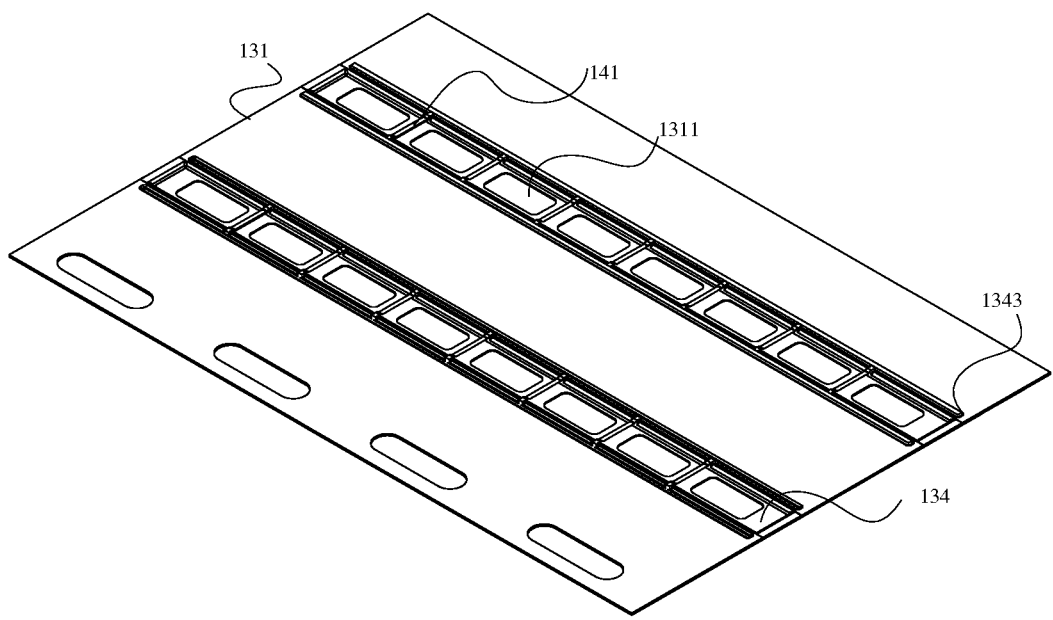
FIG. 11 is a schematic diagram of an isolation component provided with a gas blocking bar disclosed in an embodiment of the present application.

FIG. 11 shows a schematic diagram of an isolation component provided with a gas blocking bar according to an embodiment of the present application. As shown in FIG. 11, the recess 134 in the embodiment of the present application may further include at least one gas blocking bar 141. The gas blocking bar 141 is disposed on the bottom wall of the recess 134, and the gas blocking bar 141 is configured to divide the recess 134 into at least two spaces along the first direction.

Optionally, there are a plurality of the gas blocking bars 141, and the plurality of gas blocking bars 141 are arranged along the first direction, such that the gas blocking bar is arranged between the two adjacent pressure relief mechanisms 213.

As an embodiment, the plurality of gas blocking bars 141 may divide the recess 134 into a plurality of spaces along the first direction, and the plurality of spaces may in one-to-one correspondence with the pressure relief mechanisms 213 of the plurality of battery cells 20. In this way, the mutual influence among each pressure relief mechanism 213 can be reduced, and the emissions of the pressure relief mechanism 213 of one battery cell 20 can be prevented from impacting the adjacent battery cells 20.

Correspondingly, the two side walls of the recess 134 in the embodiment of the present application along the second direction may be provided with notches, such as the notch 1342 shown in FIG. 10*a*, and the gas blocking bar 141 may be disposed in the above-mentioned notch 1342. By providing a notch 1342 disposed with the gas blocking bar 141 on the isolation component 13, the gas blocking bar 141 can be quickly positioned, and so that the installation is simpler and more convenient. Or, the gas blocking bar 141 can also be directly pasted on the bottom wall of the recess 134, which is not limited in this application.

Figure 12:
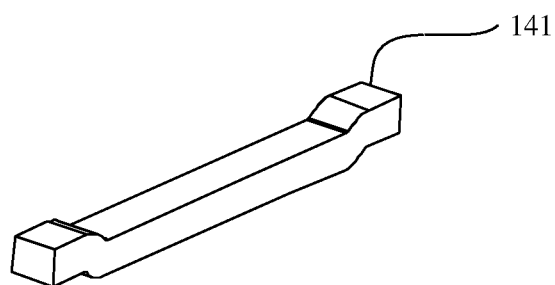
FIG. 12 is a schematic structural diagram of a gas blocking bar disclosed in an embodiment of the present application.

It should be understood that the shape of the gas blocking bar in the embodiment of the present application can be set according to actual conditions. FIG. 12 shows a schematic diagram of gas blocking bar in an embodiment of the present application. As shown in FIG. 12, the gas blocking bar 141 may be a structure that the middle portion is low and the two side portions are high, where the higher portions at both sides can match the notch 1342 provided at the outside of the recess 134, thereby achieving the positioning of the gas blocking bar 141. Under such condition, after the installation, the height of the gas blocking bar is lower than the depth of the recess 134. And the pluralities of spaces separated by the gas blocking bar are not completely isolated from each other.

Or, the gas blocking bar 141 can also be provided in a regular elongated shape, which can be directly pasted on the bottom wall of the recess 134 without providing a notch 1342. The shape of the gas blocking bar 141 is not limited in the embodiment of the present application.

As an embodiment, the gas blocking bar 141 is made of a compressible material, and after the installation is completed, the gas blocking bar 141 is compressed by the first wall 21a and the bottom wall of the recess 134.

Figure 13:
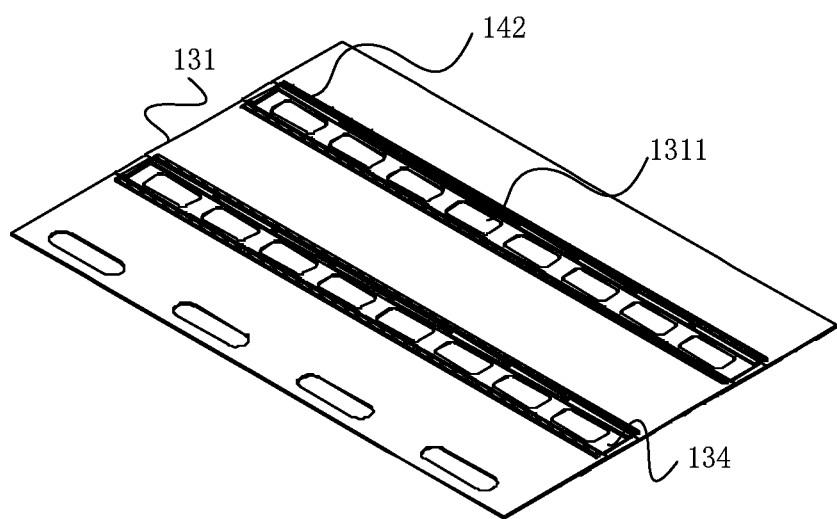
FIG. 13 is another schematic three-dimensional view of an isolation component disclosed in an embodiment of the present application.

In order to achieve the fixation between the battery cell 20 and the isolation component 13, an adhesive needs to be used between the two. Since the adhesive is easy to flow, it is likely to overflow into the recess 134 of the isolation component 13, in order to prevent the adhesive from entering the recess 134, as shown in FIG. 13, a blocking member 142 may be provided the outside of the opening of the recess 134 in the second direction. The cross-sectional view of FIG. 9c also shows the blocking member 142. The blocking member 142 is configured to prevent the adhesive from entering the recess, where the adhesive is used to fix the first wall 21a to the isolation component 13a.

As an embodiment, the blocking member 142 in the embodiment of the present application may be a rubber blocking strip.

Figure 14:
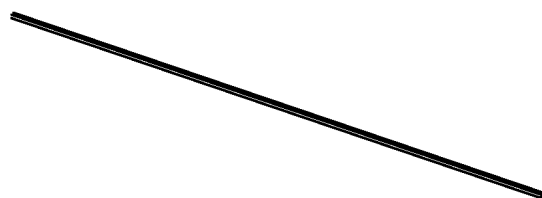
FIG. 14 is a schematic structural diagram of a blocking member disclosed in an embodiment of the present application.

Optionally, the blocking member 142 in the embodiment of the present application may be elongated or in the shape of a mouth, as shown in FIG. 14, but it should be understood that the blocking member 142 in the present application is to prevent the adhesive from entering the recess 143, and its specific shape of which can be set according to the actual situation, to which the embodiments of the present application is not limited thereto.

Optionally, the surface that is close to the battery cell group 200 in the embodiment of the present application may be provided with a second recess, such as the second recess 1343 as shown in FIG. 10, and the second recess 1343 is arranged along the first direction and is located at the outside of the opening of the recess 134 along the second direction. The second recess 1343 is configured to accommodate the above blocking component 134. Or, optionally, the blocking component 142 may also be directly disposed at the outside of the opening of the recess 134 along the first direction, and there is no need to provide a second recess 1343, which is not limited in this application.

The blocking component 142 in the embodiment of the present application may be made of a compressible material, and the blocking component 142 may be compressed by the surface of the isolation component 13 close to the battery cell group 200 and the bottom wall of the second recess 1343. Optionally, a thickness of the blocking component 142 can be determined according to the compressibility of the compressible material. By providing the blocking component 142, on the one hand, the adhesive can be prevented from entering the recess 134, and at the same time, the flatness tolerance of the isolation component 13 can be absorbed, and the thickness of the glue layer at different positions can be adjusted.

Figure 15:
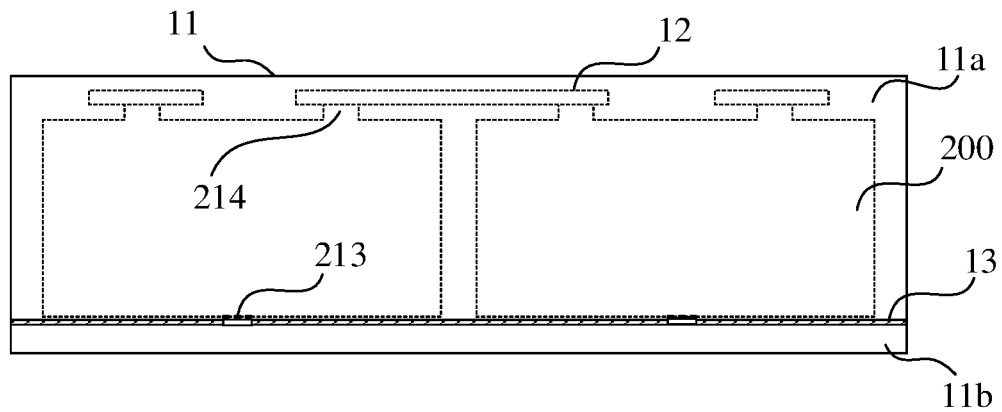
FIG. 15 is a schematic structural diagram of a battery disclosed in an embodiment of the present application.

Optionally, in an embodiment of the present application, the isolation component 13 is provided with a wall shared by the electrical chamber 11a and the collection chamber 11b. As shown in FIG. 15, the isolation component 13 may be both a wall of the electrical chamber 11a and a wall of the collection chamber 11b. That is, the isolation component 13 (or a part thereof) may directly serve as a wall shared by the electrical chamber 11a and the collection chamber 11b. In this way, the emissions from the plurality of battery cells 20 of the battery cell group 200 may enter the collection chamber 11b through the isolation component 13. Meanwhile, due to the existence of the isolation component 13, the emissions may be isolated from the electrical chamber 11a as far as possible, thereby reducing the risk of the emissions and enhancing the safety of the battery.

Figure 16:
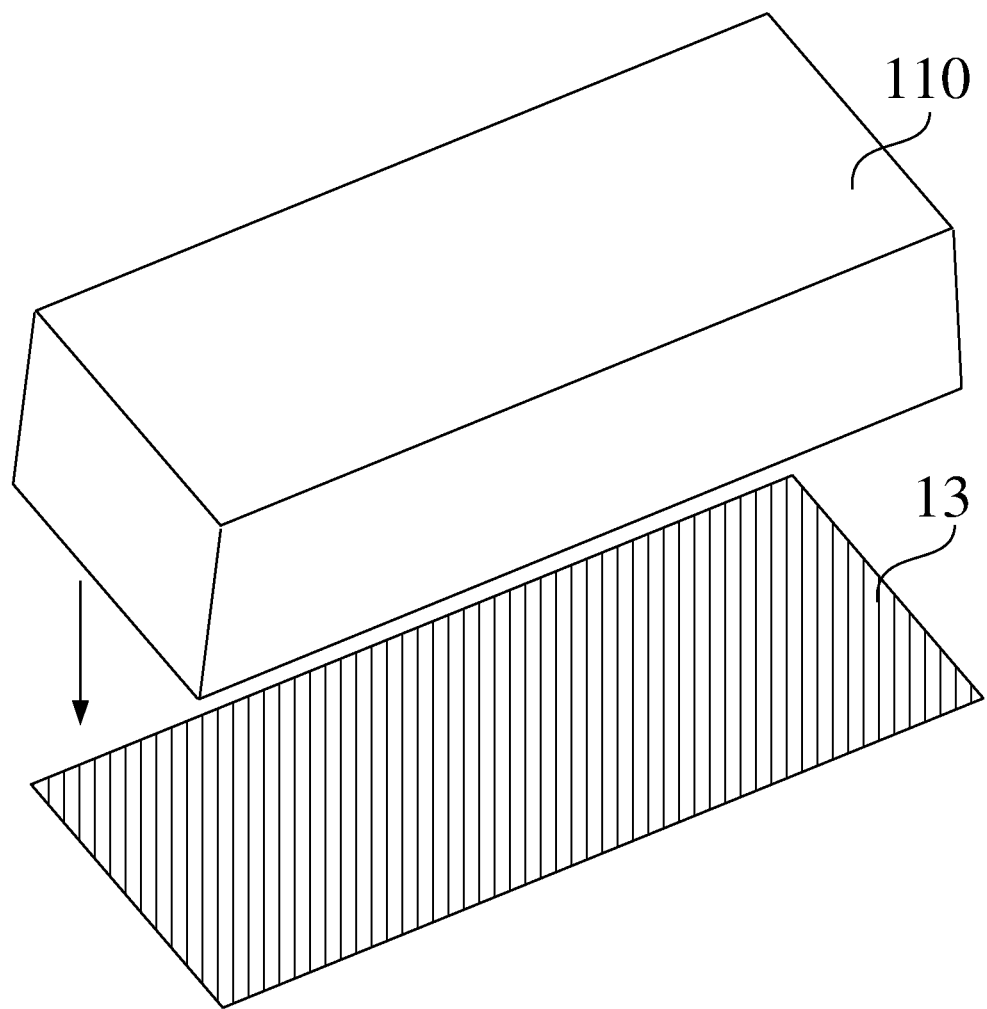
FIG. 16 is an exploded view of a box disclosed in an embodiment of the present application.

Optionally, in an embodiment of the present application, the electrical chamber 11a may be composed of a covering with an opening, and an isolation component 13. For example, as shown in FIG. 16, the box 11 further includes a covering 110 with an opening (an opening at the lower side in FIG. 16). The covering 110 with the opening is a semi-closed chamber with an opening in communication with the outside, and the isolation component 13 covers the opening to form a chamber, i.e., an electrical chamber 11a.

Optionally, the covering 110 may be composed of a plurality portions. For example, as shown in FIG. 15, the covering 110 may include a first portion 111 and a second portion 112. Openings are provided on two sides of the second portion 112 respectively. The first portion 111 covers the opening on one side of the second portion 112, and the isolation component 13 covers the opening on the other side of the second portion 112, thus the electrical chamber 11a is formed.

Figure 17:
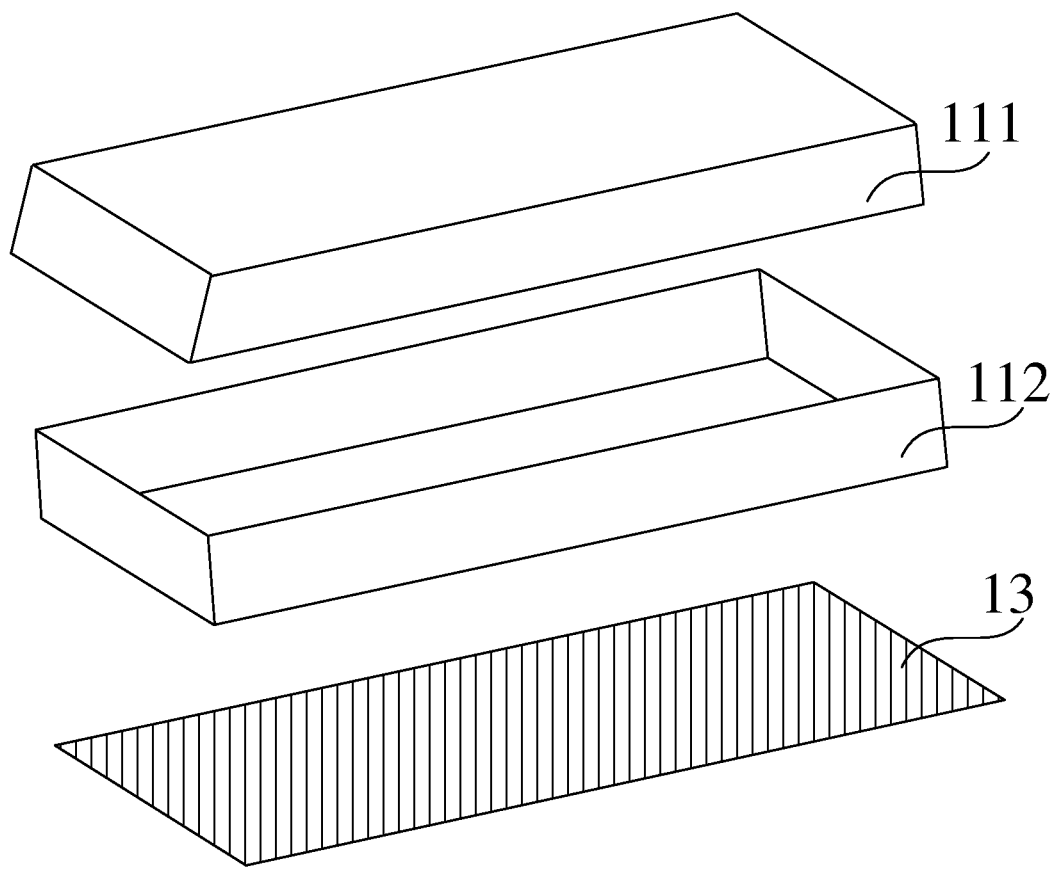
FIG. 17 is an exploded view of a box disclosed in an embodiment of the present application.

The embodiment of FIG. 17 may be obtained through improvements on the basis of FIG. 2. Specifically, a bottom wall of the second portion 112 in FIG. 2 may be replaced with the isolation component 13, and the isolation component 13 acts as a wall of the electrical chamber 11a, thus the electrical chamber 11a in FIG. 17 is formed. In other words, the bottom wall of the second portion 112 in FIG. 2 can be removed. That is, an annular wall with two opening sides is formed, and the first portion 111 and the isolation component 13 cover the openings on the two sides of the second portion 112 respectively to form a chamber, namely an electrical chamber 11a.

Figure 18:
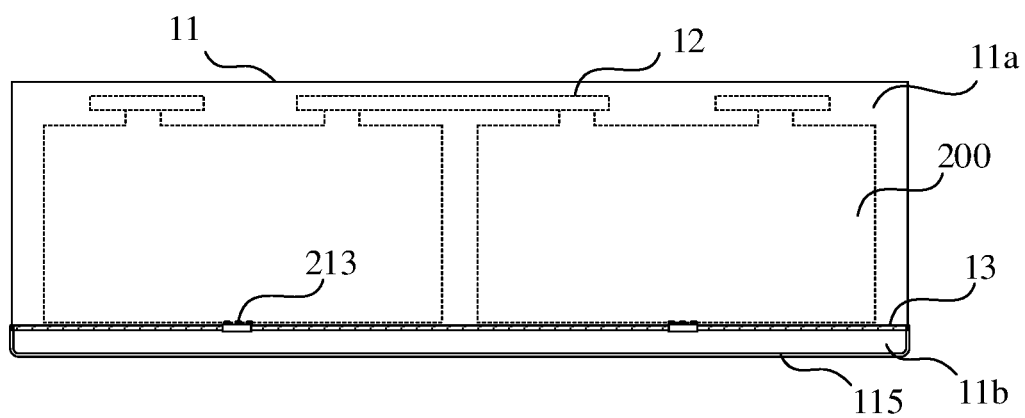
FIG. 18 is a schematic structural diagram of a battery disclosed in an embodiment of the present application.

Optionally, in an embodiment of the present application, the collection chamber 11b may be composed of an isolation component 13 and a protective member. For example, as shown in FIG. 18, the box 11 further includes a protective member 115. The protective member 115 is configured to protect the isolation component 13, and the collection chamber 11b is formed with the protective member 115 and the isolation component 13.

The collection chamber 11b formed with the protective member 115 and the isolation component 13 does not occupy the space that may accommodate the battery cells. Therefore, the collection chamber 11b with a larger space therein can be provided, which may effectively collect and buffer the emissions and reduce the risk resulting therefrom.

Optionally, in an embodiment of the present application, a fluid, such as a cooling medium, may be further provided in the collection chamber 11b, or a component for accommodating the fluid may be provided to further cool the emissions entering the collection chamber 11b.

Optionally, in an embodiment of the present application, the collection chamber 11b may be a sealed chamber. For example, the connection between the protective member 115 and the isolation component 13 may be sealed by a sealing member.

Optionally, in an embodiment of the present application, the collection chamber 11b may not be a sealed chamber. For example, the collection chamber 11b may be in communication with the air, so that a part of the emissions can be further discharged to the outside of the box 11.

In the foregoing embodiment, the opening of the covering 110 is covered by the isolation component 13 to form an electrical chamber 11a, and the collection chamber 11b is formed with the isolation component 13 and the protective member 115. Optionally, the isolation component 13 may also directly separate the closed covering into the electrical chamber 11a and the collection chamber 11b.

Figure 19:
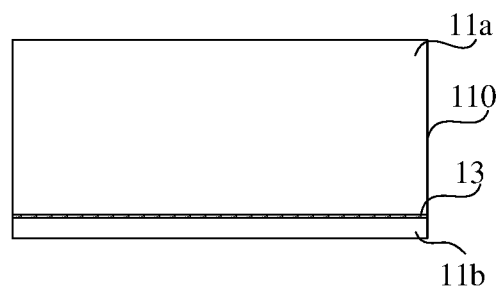
FIG. 19 is a schematic structural diagram of a box disclosed in an embodiment of the present application.

For example, as shown in FIG. 19, in an embodiment of the present application, the box 11 further includes a closed covering 110. The isolation component 13 is disposed inside the covering 110 and separates the inside of the covering 110 into the electrical chamber 11a and the collection chamber 11b. That is, a chamber is formed inside the closed covering 110, and the isolation component 13 separates the chamber inside the covering 110 into two chambers, namely the electrical chamber 11a and the collection chamber 11b.

Since the electrical chamber 11a needs a relatively large space to accommodate a plurality of battery cells 20, etc., the isolation component 13 may be provided a position near a certain wall of the covering 110 to isolate the electrical chamber 11a with a relatively large space from the collection chamber 11b with a relatively small space.

Figure 20:
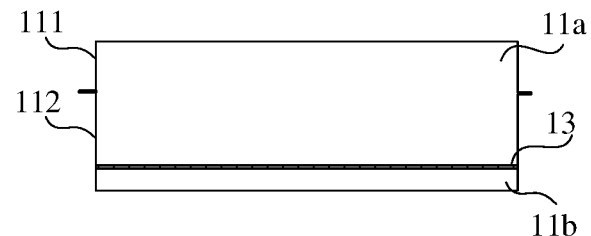
FIG. 20 is a schematic structural diagram of a box disclosed in an embodiment of the present application.

Optionally, as shown in FIG. 20, in an embodiment of the present application, the covering 110 may include a first portion 111 and a second portion 112. A side of the second portion 112 is provided with an opening to form a semi-closed structure. The semi-closed structure is a chamber with an opening. The isolation component 13 is provided inside the second portion 112, and the first portion 111 covers the opening of the second portion 112. In other words, the isolation component 13 can be first placed in the semi-closed second portion 112 to isolate the collection chamber 11b, and then the first portion 111 covers the opening of the second portion 112 to form the electrical chamber 11a.

Optionally, in an embodiment of the present application, the electrical chamber 11a is isolated from the collection chamber 11b by the isolation component 13. That is, the collection chamber 11b is not in communication with the electrical chamber 11a, and liquid or gas, and like in the collection chamber 11b cannot enter the electrical chamber 11a, so that the electrical chamber 11a can be better protected.

When the pressure relief mechanism 213 is actuated, the pressure relief mechanism 213 is opened to discharge the emissions of the battery cell 20. The emissions may damage the isolation component 13, and thus pass through the isolation component 13 and enter the collection chamber 11b.

Figure 21:
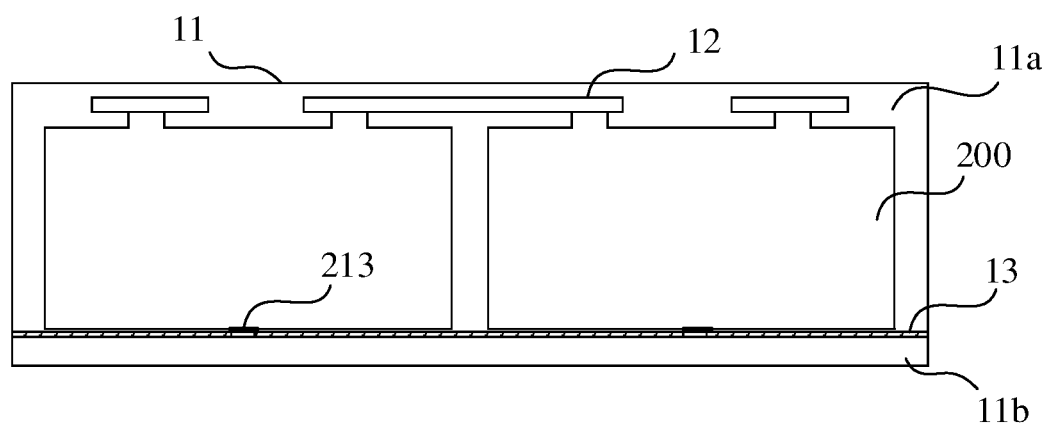
FIG. 21 is a schematic structural diagram of a battery disclosed in an embodiment of the present application.

FIG. 21 is a schematic structural diagram of a battery 10 in an embodiment of the present application. The battery 10 may include a box 11, a battery cell group 200, and a bus component 12.

The battery cell group 200 includes a plurality of battery cells 20, where the battery cell 20 includes a pressure relief mechanism 213, the pressure relief mechanism 213 is configured to be actuated when the internal pressure or temperature of the battery cell 20 provided with the pressure relief mechanism 213 reaches a threshold, to relieve the internal pressure or temperature.

The bus component 12 is configured to implement electric connection among the plurality of battery cells 20.

The box 11 is a box 11 described in the foregoing embodiments, and the electrical chamber 11a of the box 11 is configured to accommodate the battery cells 20, where the collection chamber 11b of the box 11 collects the emissions of the battery cell 20 provided with the pressure relief mechanism 213, when the pressure relief mechanism 213 is actuated.

Figure 22:
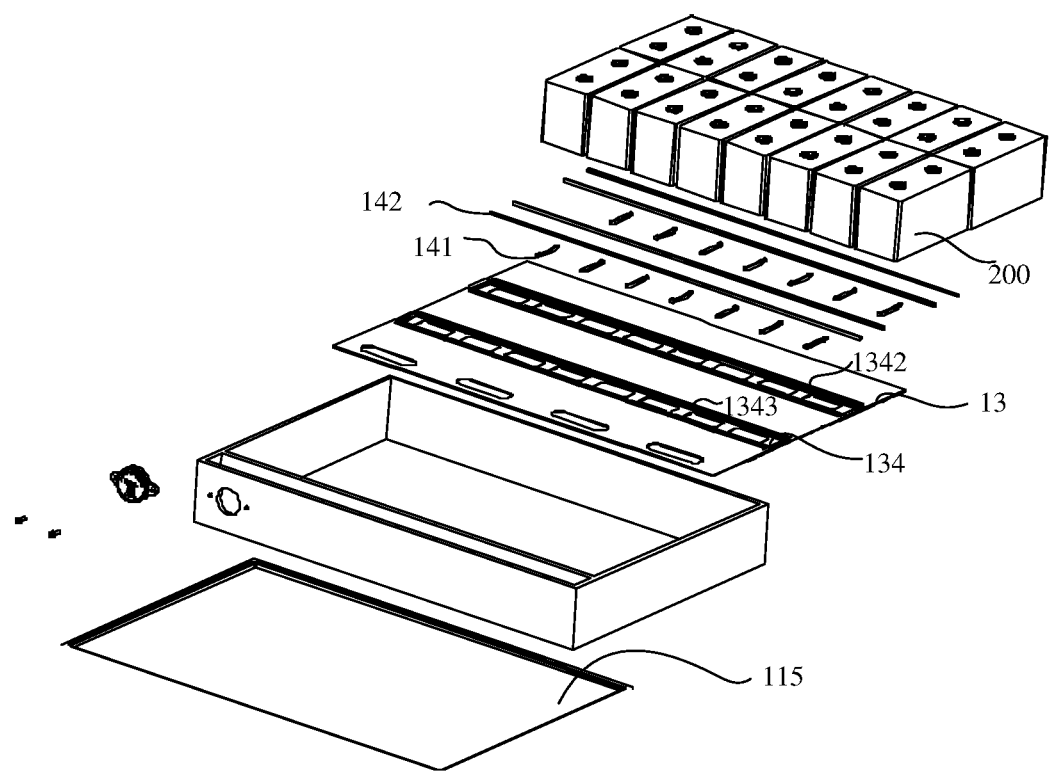
FIG. 22 is an exploded view of a battery disclosed in an embodiment of the present application.

FIG. 22 is an exploded view of a battery 10 according to an embodiment of the present application. In the embodiment shown in FIG. 19, the isolation component 13 is provided with a recess 134, and a collection chamber is formed with the isolation component 13 and a protective member 115.

For the description of each component in the battery 10, reference can be made to the foregoing embodiments, which will not be repeated here for brevity.

An embodiment of the present application further provides a power consumption apparatus, which may include the battery 10 in each of the foregoing embodiments. Optionally, the power consumption apparatus may be a vehicle 1, a ship or a spacecraft.

The box of the battery, the battery and the power consumption apparatus according to the embodiments of the present application are described above, and a method and apparatus for preparing a battery according to the embodiments of the present application will be described below. For the parts not described in detail, reference can be made to the foregoing embodiments.

Figure 23:
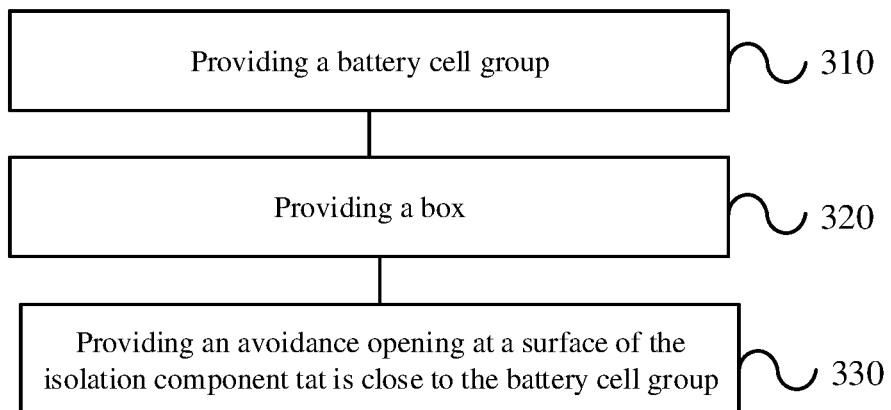
FIG. 23 is a schematic flowchart of a method for producing a battery disclosed in an embodiment of the present application.

FIG. 23 shows a schematic flowchart of a method 300 for producing a battery according to an embodiment of the present application. As shown in FIG. 23, the method 300 may include:

S310, providing a battery cell group 200, where the battery cell group 200 includes a plurality of battery cells 20 arranged along a first direction, at least two battery cells 20 of the plurality of battery cells 20 includes a pressure relief mechanism 213, the pressure relief mechanism 213 is disposed on a first wall 21a of the battery cell 20, and the pressure relief mechanism 213 is configured to be actuated when internal pressure or a temperature of the battery cell 20 reaches a threshold value to relieve the internal pressure;

S320, providing a box 11, where the box includes: an electrical chamber 11a, configured to accommodate the battery cell group 200; a collection chamber 11b, configured to collect emissions of the battery cell 20 provided with the pressure relief mechanism 213 when the pressure relief mechanism 213 is actuated; an isolation component 13 for isolating the electrical chamber 11a and the collection chamber 11b, such that the electrical chamber 11a and the collection chamber 11b are arranged at both sides of the isolation component 13; and S330, where the first wall is attached to the isolation component, a surface of the isolation component 13 that is close to the battery cell group 200 is provided with an avoidance opening, the avoidance opening extends along the first direction, and the plurality of pressure relief mechanisms 213 of the battery cell group 200 face the avoidance opening.

Figure 24:
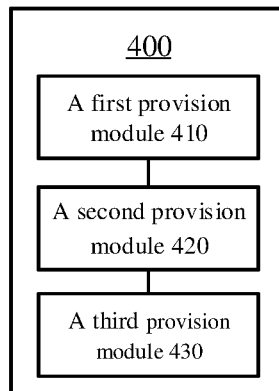
FIG. 24 is a schematic block diagram of an apparatus for producing a battery disclosed in an embodiment of the present application.

FIG. 24 shows a schematic block diagram of an apparatus 400 for producing a battery according to an embodiment of the present application. As shown in FIG. 24, the apparatus 400 for producing a battery may include: a first provision module 410, a second provision module 420 and an installation module 430.

The first provision module 410 is configured to provide a battery cell group, where the battery cell group includes a plurality of battery cells arranged along a first direction, the battery cell includes a pressure relief mechanism, the pressure relief mechanism is disposed on a first wall of the battery cell, and the pressure relief mechanism is configured to be actuated when internal pressure or a temperature of the battery cell reaches a threshold value to relieve the internal pressure.

The second provision module 420 is configured to provide a box, where the box includes: an electrical chamber, configured to accommodate the battery cell group; a collection chamber, configured to collect emissions of the battery cell provided with the pressure relief mechanism when the pressure relief mechanism is actuated; an isolation component for isolating the electrical chamber and the collection chamber, such that the electrical chamber and the collection chamber are arranged on both sides of the isolation component.

The installation module 430 is configured to provide an avoidance opening at a surface of the isolation component that is close to the battery cell group, where the avoidance opening extends along the first direction, and the plurality of pressure relief mechanisms of the battery cell group face the avoidance opening.

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A box of a battery, comprising:
    an electrical chamber, configured to accommodate a battery cell group, wherein the battery cell group comprises a plurality of battery cells arranged along a first direction, the plurality of battery cells comprise a first battery cell and a second battery cell, the first battery cell comprises a first pressure relief mechanism, the second battery cell comprises a second pressure relief mechanism, the first pressure relief mechanism is disposed on a first wall of the first battery cell, the second pressure relief mechanism is disposed on a first wall of the second battery cell;
    a collection chamber, configured to collect emissions of the first battery cell and/or second battery cell when the first pressure relief mechanism and/or the second pressure relief mechanism is actuated;
    an isolation component, configured to isolate the electrical chamber from the collection chamber, such that the isolation component is between the electrical chamber and the collection chamber;
    wherein the first wall of the first battery cell and the first wall of the second battery cell are attached to the isolation component, a surface of the isolation component that is close to the battery cell group is provided with a continuous avoidance opening, the continuous avoidance opening extends along the first direction, and the first pressure relief mechanism and the second pressure relief mechanism face the continuous avoidance opening.

2. The box according to claim 1, wherein the continuous avoidance opening is configured to provide a deformation space for the first pressure relief mechanism and/or the second pressure relief mechanism, such that the first pressure relief mechanism and/or the second pressure relief mechanism deforms and ruptures towards a direction that is close to the isolation component when the first pressure relief mechanism and/or the second pressure relief mechanism is actuated.

3. The box according to claim 1, wherein the continuous avoidance opening is a recess or a through hole.

4. The box according to claim 3, wherein a width of the continuous avoidance opening along a second direction is greater than a width of the first pressure relief mechanism and/or the second pressure relief mechanism along the second direction, wherein the second direction is perpendicular to the first direction.

5. The box according to claim 3, when the continuous avoidance opening is a recess, a bottom wall of the recess is provided with an exhaust hole, and the emissions of the first battery cell and/or the second battery cell enter the collection chamber through the exhaust hole.

6. The box according to claim 3, wherein the box comprises a gas blocking bar, the gas blocking bar is disposed at the bottom wall of the recess, and the gas blocking bar is configured to divide the recess into two spaces along the first direction.

7. The box according to claim 6, wherein the gas blocking bar is arranged between the first pressure relief mechanisms and the second pressure relief mechanism.

8. The box according to claim 3, wherein a blocking member is provided at an outer side of an opening of the recess along the second direction, and the blocking member is configured to block an adhesive from entering the recess, wherein the adhesive is configured to fix the first wall to the isolation component, and the second direction is perpendicular to the first direction.

9. The box according to claim 8, wherein a second recess is provided at the surface of the isolation component that is close to the battery cell group, and the second recess extends along the first direction and is located at the outer side of the opening of the recess along the second direction, and the second recess is configured to accommodate the blocking member.

10. The box according to claim 1, wherein inside of the isolation component is provided with a flow channel, and the flow channel is configured to contain a fluid such that the isolation component adjusts the temperature for the first battery cell and/or the second battery cell;
    wherein the isolation component is configured to damage when the first pressure relief mechanism and/or the second pressure relief mechanism is actuated, such that the fluid is discharged from inside of the isolation component.

11. The box according to claim 3, wherein the isolation component comprises a first plate and a second plate, the first plate is located at one side of the second plate that is close to the electrical chamber and attached to the first wall of the first battery cell and the first wall of the second battery cell, a first region of the first plate is recessed towards the second plate to form the recess, and the first region is connected to the second plate.

12. The box according to claim 11, wherein the first region is provided with a first exhaust hole, and the first exhaust hole is disposed opposite to the first pressure relief mechanism or the second pressure relief mechanism.

13. The box according to claim 12, wherein the second plate is provided with a second exhaust hole at a position corresponding to the first exhaust hole.

14. The box according to claim 12, wherein the first exhaust hole is sealed by a first sealing layer and/or the second exhaust hole is sealed by a second sealing layer.

15. The box according to claim 12, wherein a thickness of a region of the second plate corresponding to the first exhaust hole is less than a thicknesses of other regions of the second plate.

16. The box according to claim 5, wherein a weakened zone is provided at a bottom wall of the continuous avoidance opening, the weakened zone is configured to damage by the emissions discharged from inside of the first battery cell and/or the second battery cell when the first pressure relief mechanism and/or the second pressure relief mechanism is actuated, such that the emissions enter the collection chamber through the weakened zone, and wherein a thickness of the weakened zone is less than or equal to 3 mm.

17. The box according to claim 1, wherein the isolation component is provided with a second through hole, and the emissions are discharged through the second through hole.

18. The box according to claim 1, wherein a second wall of the first battery cell is provided with electrode terminals, a second wall of the second battery cell is provided with electrode terminals, and the second wall is different from the first wall.

19. A battery, comprising:
   a battery cell group, wherein the battery cell group comprises a plurality of battery cells arranged along a first direction, the plurality of battery cells comprise a first battery cell and a second battery cell, the first battery cell comprises a first pressure relief mechanism, the second battery cell comprises a second pressure relief mechanism, and,
   a box of the battery, wherein the box comprising:
   an electrical chamber, configured to accommodate a battery cell group;
   a collection chamber, configured to collect emissions of the first battery cell and/or the second battery cell when the first pressure relief mechanism and/or the second pressure relief mechanism is actuated;
   an isolation component, configured to isolate the electrical chamber from the collection chamber, such that the isolation component is between the electrical chamber and the collection chamber;
   wherein the first wall of the first battery cell and the first wall of the second battery cell are attached to the isolation component, a surface of the isolation component that is close to the battery cell group is provided with a continuous avoidance opening, the continuous avoidance opening extends along the first direction, and the first pressure relief mechanism and the second pressure relief mechanism face the continuous avoidance opening.

20. A power consumption device, comprising a battery, wherein the battery comprising:
   a battery cell group, wherein the battery cell group comprises a plurality of battery cells arranged along a first direction, the plurality of battery cells comprise a first battery cell and a second battery cell, the first battery cell comprises a first pressure relief mechanism, the second battery cell comprises a second pressure relief mechanism;
   and,
   a box of the battery, wherein the box comprising:
   an electrical chamber, configured to accommodate a battery cell group;
   a collection chamber, configured to collect emissions of the first battery cell and/or second battery cell when the first pressure relief mechanism and/or the second pressure relief mechanism is actuated;
   an isolation component, configured to isolate the electrical chamber from the collection chamber, such that the isolation component is between the electrical chamber and the collection chamber;
   wherein the first wall of the first battery cell and the first wall of the second battery cell attached to the isolation component, a surface of the isolation component that is close to the battery cell group is provided with a continuous avoidance opening, the continuous avoidance opening extends along the first direction, and the first pressure relief mechanism and the second pressure relief mechanism face the continuous avoidance opening.

* * * * *